(12) United States Patent
Matsumoto

(10) Patent No.: US 12,608,799 B2
(45) Date of Patent: Apr. 21, 2026

(54) INFORMATION PROCESSING APPARATUS, INFORMATION PROCESSING METHOD, AND PROGRAM

(71) Applicant: FUJIFILM Corporation, Tokyo (JP)

(72) Inventor: Tsuyoshi Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 412 days.

(21) Appl. No.: 18/312,023

(22) Filed: May 4, 2023

(65) Prior Publication Data

US 2023/0274430 A1 Aug. 31, 2023

Related U.S. Application Data

(63) Continuation of application No. PCT/JP2021/034785, filed on Sep. 22, 2021.

(30) Foreign Application Priority Data

Nov. 19, 2020 (JP) ................................. 2020-192722

(51) Int. Cl.
G06K 9/00 (2022.01)
G06F 3/14 (2006.01)
(Continued)

(52) U.S. Cl.
CPC .............. G06T 7/0012 (2013.01); G06F 3/14 (2013.01); G06V 10/761 (2022.01); G06T 2207/10132 (2013.01); G06T 2207/30101 (2013.01)

(58) Field of Classification Search
CPC ......... G06K 9/00; A61B 8/06; G01S 7/52084; G01S 7/5208
(Continued)

(56) References Cited

U.S. PATENT DOCUMENTS

2004/0116812 A1 6/2004 Selzer et al.
2007/0249912 A1 10/2007 Tek
(Continued)

FOREIGN PATENT DOCUMENTS

CN 102467663 A 5/2012
CN 104814765 A 8/2015
(Continued)

OTHER PUBLICATIONS

The extended European search report issued by the European Patent Office on Oct. 24, 2023, which corresponds to European Patent Application No. 21894316.5.
(Continued)

*Primary Examiner* — Seyed H Azarian
(74) *Attorney, Agent, or Firm* — Studebaker Brackett PLLC

(57) ABSTRACT

The information processing apparatus performs processing on an ultrasound image (U), which is generated by transmitting ultrasound beams (UB) from a transducer array (13) toward the inside of a living body (30) and receiving ultrasound echoes generated in the living body (30). The information processing apparatus includes: a blood vessel detection unit (71) that detects a blood vessel region (Ra) including a blood vessel (B) from the ultrasound image (U); a structure detection unit (72) that detects a structure other than a blood vessel (B) from the ultrasound image (U); and an artery/vein determination unit (73) that determines whether the blood vessel (B) included in the blood vessel region (Ra) is an artery or a vein based on a relative positional relationship between the blood vessel region (Ra) and the structure.

7 Claims, 20 Drawing Sheets

(51) Int. Cl.
 G06T 7/00 (2017.01)
 G06V 10/74 (2022.01)
(58) Field of Classification Search
 USPC ....... 382/100, 103, 106, 128–133, 154, 156, 382/162, 168, 173, 181, 199, 219, 224, 382/254, 285–291, 305, 312; 600/459, 600/465
 See application file for complete search history.

(56) References Cited

U.S. PATENT DOCUMENTS

| | | | |
|---|---|---|---|
| 2008/0262354 A1 | 10/2008 | Yoshida et al. | |
| 2011/0137175 A1 | 6/2011 | Hossack et al. | |
| 2012/0114195 A1 | 5/2012 | Matsuda et al. | |
| 2014/0343431 A1 | 11/2014 | Vajinepalli et al. | |
| 2015/0209004 A1 | 7/2015 | Tamada | |
| 2018/0014810 A1 | 1/2018 | Chen et al. | |
| 2018/0344169 A1* | 12/2018 | Umezawa | A61B 5/748 |
| 2020/0229795 A1 | 7/2020 | Tadross et al. | |
| 2021/0007707 A1* | 1/2021 | Sethuraman | G01S 7/5208 |
| 2021/0137492 A1 | 5/2021 | Imai | |
| 2022/0110603 A1* | 4/2022 | Shulepov | A61B 8/06 |
| 2022/0225966 A1* | 7/2022 | Raju | G16H 30/40 |
| 2022/0277446 A1 | 9/2022 | Fonte et al. | |
| 2023/0255588 A1* | 8/2023 | Sethuraman | G01S 7/52084 600/459 |
| 2023/0301631 A1* | 9/2023 | Poland | A61B 8/0891 |
| 2023/0404528 A1* | 12/2023 | Fernando | A61B 8/4254 |

FOREIGN PATENT DOCUMENTS

| | | | |
|---|---|---|---|
| CN | 105051784 A | 11/2015 |
| CN | 111134727 A | 5/2020 |
| EP | 3 564 963 A1 | 11/2019 |
| JP | 2007-222291 A | 9/2007 |
| JP | 2015-500122 A | 1/2015 |
| JP | 2017-524455 A | 8/2017 |
| WO | 2013/161228 A1 | 10/2013 |
| WO | 2014/034148 A1 | 3/2014 |
| WO | 2020/044769 A1 | 3/2020 |

OTHER PUBLICATIONS

An Office Action; "Notice of Reasons for Refusal," mailed by the Japanese Patent Office on Mar. 25, 2025, which corresponds to Japanese Patent Application No. 2022-563599 and is related to U.S. Appl. No. 18/312,023; with English language translation.

International Search Report issued in PCT/JP2021/034785; mailed Dec. 14, 2021.

International Preliminary Report on Patentability (Chapter I) and Written Opinion of the International Searching Authority issued in PCT/JP2021/034785; issued May 16, 2023.

An Office Action; mailed by the China National Intellectual Property Administration of the People's Republic of China on Jun. 27, 2025, which corresponds to Chinese Patent Application No. 202180075812.0 and is related to U.S. Appl. No. 18/312,023.

\* cited by examiner

FIG. 1

INFORMATION PROCESSING APPARATUS, INFORMATION PROCESSING METHOD, AND PROGRAM

CROSS-REFERENCE TO RELATED APPLICATION

This application is a continuation application of International Application No. PCT/JP2021/034785, filed Sep. 22, 2021, the disclosure of which is incorporated herein by reference in its entirety. Further, this application claims priority from Japanese Patent Application No. 2020-192722 filed on Nov. 19, 2020, the disclosure of which is incorporated herein by reference in its entirety.

BACKGROUND

1. Technical Field

A technique of the present disclosure relates to an information processing apparatus, an information processing method, and a program.

2. Description of the Related Art

In the related art, an ultrasound diagnostic apparatus has been known as an apparatus that obtains an image of the inside of a subject. In general, an ultrasound diagnostic apparatus includes an ultrasound probe provided with a transducer array in which a plurality of ultrasound transducers are arranged. The ultrasound probe transmits ultrasound beams from the transducer array toward the inside of the subject in a state of being in contact with a body surface of the subject, and receives ultrasound echoes from the subject by the transducer array. Thereby, an electric signal corresponding to the ultrasound echoes is acquired. Further, the ultrasound diagnostic apparatus generates an ultrasound image for the corresponding portion of the subject by processing the acquired electric signal.

By the way, a technique (so-called echo-guided puncture method) of inserting a so-called puncture needle into a blood vessel of a subject while observing the inside of the subject using an ultrasound diagnostic apparatus is known. In the echo-guided puncture method, an operator usually needs to recognize positions, shapes, and the like of blood vessels included in an ultrasound image by confirming the ultrasound image. However, in order to accurately recognize positions, shapes, and the like of blood vessels, a certain level of proficiency is required. For this reason, a technique of automatically detecting blood vessels included in an ultrasound image and presenting the detected blood vessels to an operator is proposed (refer to, for example, JP2017-524455A).

SUMMARY

In puncture, an operator needs to accurately determine whether a blood vessel is an artery or a vein based on the ultrasound image. Hereinafter, the determination will be referred to as artery/vein determination.

It is also considered to perform artery/vein determination of a blood vessel by information processing such as image analysis based on the ultrasound image. However, in a case where artery/vein determination is individually performed on the blood vessels, the determination is likely to be erroneous when shapes and the like of arteries and veins are similar.

An object of the technique of the present disclosure is to provide an information processing apparatus, an information processing method, and a program capable of improving accuracy of artery/vein determination of a blood vessel.

According to an aspect of the present disclosure, there is provided an information processing apparatus that performs processing on an ultrasound image, which is generated by transmitting ultrasound beams from a transducer array toward the inside of a living body and receiving ultrasound echoes generated in the living body, the apparatus including: a blood vessel detection unit that detects a blood vessel region including a blood vessel from the ultrasound image; a structure detection unit that detects a structure other than a blood vessel from the ultrasound image; and an artery/vein determination unit that determines whether the blood vessel included in the blood vessel region is an artery or a vein based on a relative positional relationship between the blood vessel region and the structure.

Preferably, the information processing apparatus further includes: a highlight display unit that displays the blood vessel region in the ultrasound image displayed on a display device such that the blood vessel included in the blood vessel region is identified as an artery or a vein.

Preferably, the blood vessel detection unit determines whether the blood vessel included in the blood vessel region is an artery or a vein, in addition to detection of the blood vessel region.

Preferably, the information processing apparatus further includes: a correction unit that corrects a result of artery/vein determination by the blood vessel detection unit based on a result of artery/vein determination by the artery/vein determination unit.

Preferably, the correction unit compares reliability of artery/vein determination by the blood vessel detection unit with reliability of artery/vein determination by the artery/vein determination unit, and selects a determination result having higher reliability.

Preferably, the highlight display unit displays, on the display device, reliability on the determination result selected by the correction unit.

Preferably, the highlight display unit displays, on the display device, a message urging an operator to pay attention in a case where the reliability on the determination result selected by the correction unit is lower than a certain value.

According to another aspect of the present disclosure, there is provided an information processing method for performing processing on an ultrasound image, which is generated by transmitting ultrasound beams from a transducer array toward the inside of a living body and receiving ultrasound echoes generated in the living body, the method including: detecting a blood vessel region including a blood vessel from the ultrasound image; detecting a structure other than a blood vessel from the ultrasound image; and determining whether the blood vessel included in the blood vessel region is an artery or a vein based on a relative positional relationship between the blood vessel region and the structure.

According to still another aspect of the present disclosure, there is provided a program causing a computer to execute a process for performing processing on an ultrasound image, which is generated by transmitting ultrasound beams from a transducer array toward the inside of a living body and receiving ultrasound echoes generated in the living body, the process including: detecting a blood vessel region including a blood vessel from the ultrasound image; detecting a structure other than a blood vessel from the ultrasound image; and determining whether the blood vessel included in the blood vessel region is an artery or a vein based on a relative positional relationship between the blood vessel region and the structure.

According to the technique of the present disclosure, it is possible to provide an information processing apparatus, an information processing method, and a program capable of improving accuracy of artery/vein determination of a blood vessel.

BRIEF DESCRIPTION OF THE DRAWINGS

Exemplary embodiments according to the technique of the present disclosure will be described in detail based on the following figures, wherein:

FIG. 1 is an external view illustrating an example of a configuration of an ultrasound diagnostic apparatus according to a first embodiment.

DETAILED DESCRIPTION

Figure 2:
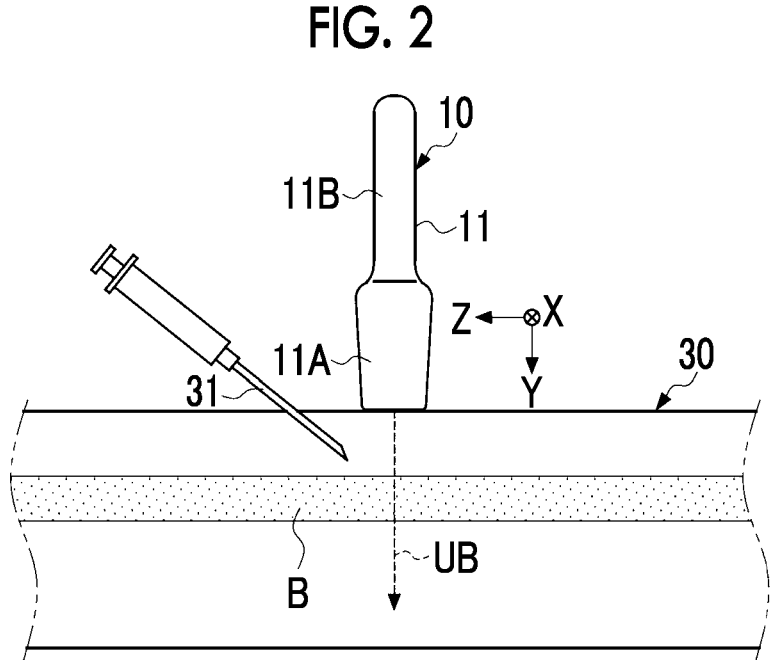
FIG. 2 is a diagram illustrating an example of an echo-guided puncture method.

Hereinafter, embodiments according to the technique of the present disclosure will be described with reference to the accompanying drawings. A description of components to be described below is based on a representative embodiment of the present disclosure. On the other hand, the technique of the present disclosure is not limited to such an embodiment.

First Embodiment

Figure 1:
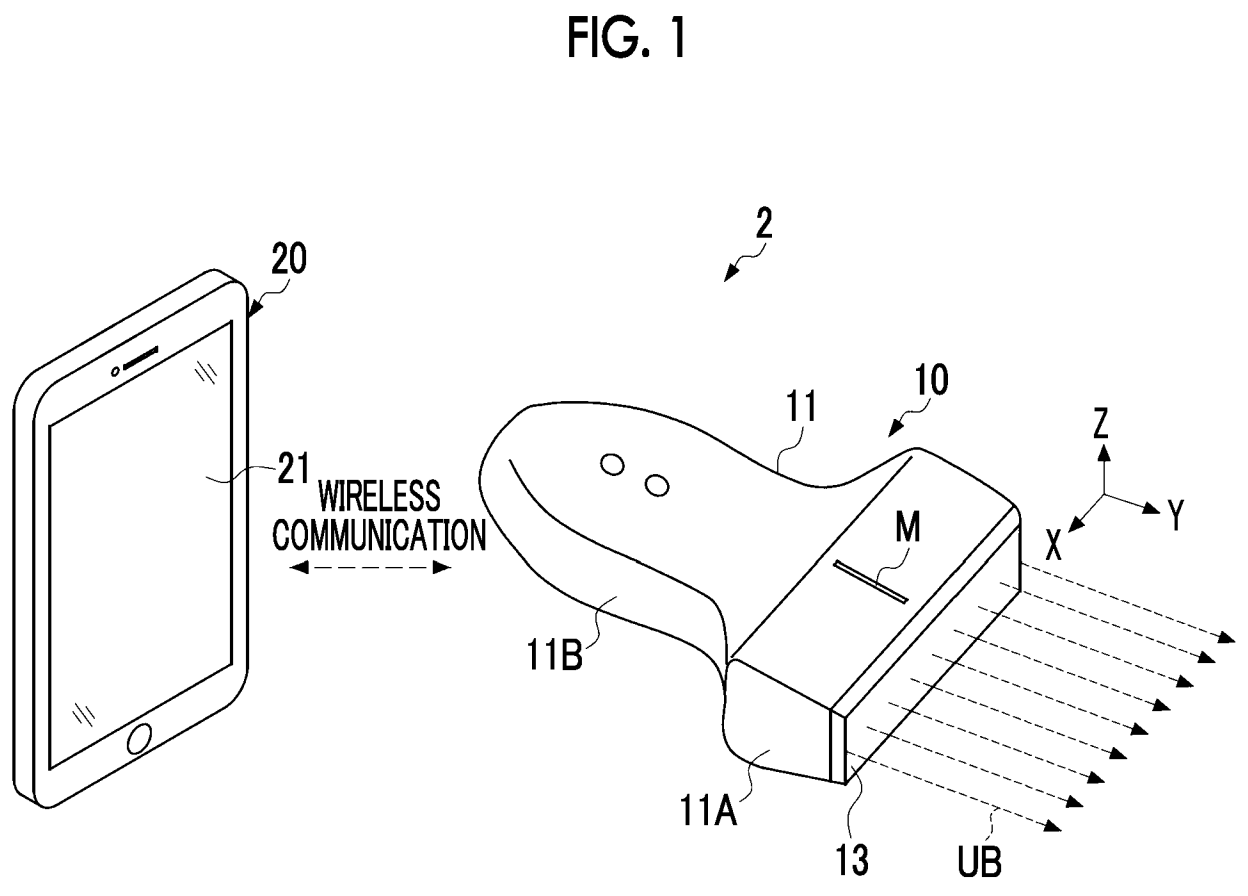

FIG. 1 illustrates an example of a configuration of an ultrasound diagnostic apparatus 2 according to the technique of the present disclosure. The ultrasound diagnostic apparatus 2 according to the present embodiment includes an ultrasound probe 10 and an apparatus main body 20. The ultrasound probe 10 is held by an operator and is brought into contact with a surface of a living body to be measured. The ultrasound probe 10 transmits and receives ultrasound beams UBs to and from the inside of the living body.

The apparatus main body 20 is, for example, a smartphone, a tablet terminal, or the like. By installing a program such as application software in the apparatus main body 20, the apparatus main body 20 performs imaging of a signal or the like which is output from the ultrasound probe 10. The ultrasound probe 10 and the apparatus main body 20 perform wireless communication with each other by, for example, WiFi or Bluetooth (registered trademark). The apparatus main body 20 is not limited to a mobile terminal such as a smartphone or a tablet terminal, and may be a personal computer (PC) or the like. The apparatus main body 20 is an example of an "information processing apparatus" according to the technique of the present disclosure.

The ultrasound probe 10 includes a housing 11. The housing 11 is configured by an array housing part 11A and a grip portion 11B. The array housing part 11A houses a transducer array 13 (refer to FIG. 3). The grip portion 11B is connected to the array housing part 11A, and is gripped by the operator. Here, for the sake of explanation, a direction from the grip portion 11B toward the array housing part 11A is defined as a +Y direction, a width direction of the ultrasound probe 10 orthogonal to the Y direction is defined as an X direction, and a direction orthogonal to the X direction and the Y direction (that is, a thickness direction of the ultrasound probe 10) is defined as a Z direction.

An acoustic lens is disposed at an end portion of the array housing part 11A in the +Y direction. A so-called acoustic matching layer (not illustrated) is disposed on the transducer array 13, and the acoustic lens is disposed on the acoustic matching layer. A plurality of transducers included in the transducer array 13 are linearly arranged along the X direction. That is, the ultrasound probe 10 according to the present embodiment has a linear type, and linearly transmits ultrasound beams UBs. The ultrasound probe 10 may have a convex type in which the transducer array 13 is disposed in a convex curved shape. In this case, the ultrasound probe 10 radially transmits ultrasound beams UBs. Further, the ultrasound probe 10 may have a sector type.

In addition, a linear guide marker M extending along the Y direction is attached to an outer peripheral portion of the array housing part 11A. The guide marker M is used as a guide when the operator brings the ultrasound probe 10 into contact with a living body.

The apparatus main body 20 includes a display device 21 for displaying an ultrasound image based on a signal transmitted from the ultrasound probe 10. The display device 21 is, for example, a display device such as an organic electro-luminescence (organic EL) display or a liquid crystal display. A touch panel is incorporated in the display device 21.

The operator can perform various operations on the apparatus main body 20 by using the touch panel.

FIG. 2 is a diagram illustrating an example of an echo-guided puncture method. As illustrated in FIG. 2, the ultrasound probe 10 is used when the operator punctures a puncture needle 31 into a blood vessel B in a living body 30 while checking an ultrasound image displayed on the apparatus main body 20. The living body 30 is, for example, an arm of a person. In the ultrasound probe 10, for example, the ultrasound probe 10 is brought into contact with the surface of the living body 30 such that the width direction (that is, the X direction) of the ultrasound probe 10 crosses a traveling direction of the blood vessel B. This procedure is called a short-axis method (or crossing method). A cross section of the blood vessel B is displayed in the ultrasound image. The operator punctures, for example, a vein of one or more blood vessels B displayed in the ultrasound image.

In addition to the blood vessel, an anatomical structure (hereinafter, simply referred to as a structure) is present in the living body 30. The structure is, for example, a biological tissue such as a tendon, a bone, a nerve, or a muscle. The types and features of the structures included in the living body 30 differ depending on the parts (arms, legs, abdomen, and the like) of the living body 30.

The apparatus main body 20 supports puncturing by the operator by detecting a blood vessel from the ultrasound image, performing artery/vein determination of the blood vessel, and displays a result of the artery/vein determination in the ultrasound image displayed on the display device 21.

Figure 3:
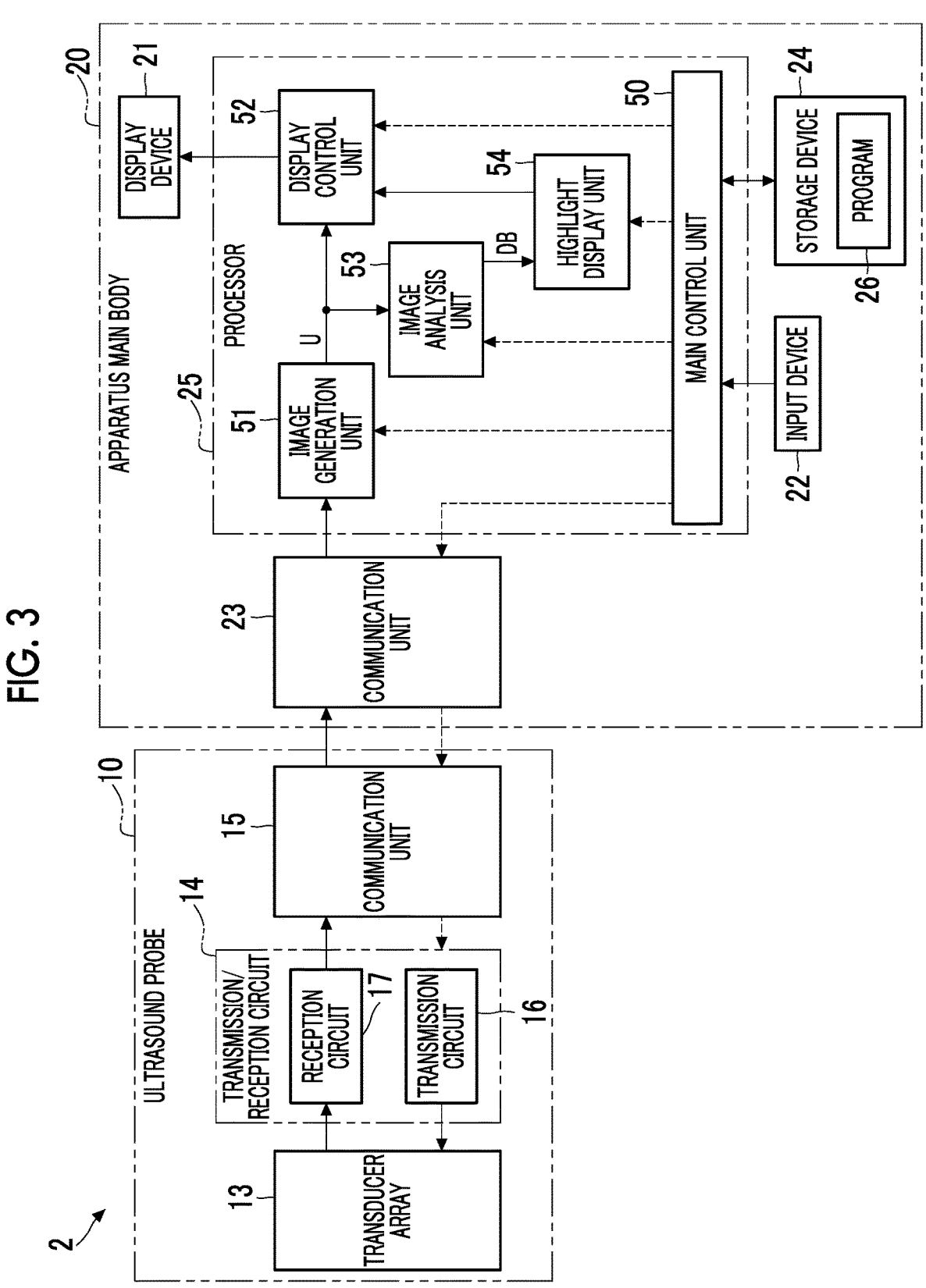
FIG. 3 is a block diagram illustrating an example of a configuration of the ultrasound diagnostic apparatus.

FIG. 3 illustrates an example of a configuration of the ultrasound diagnostic apparatus 2. The ultrasound probe 10 includes a transducer array 13, a transmission/reception circuit 14, and a communication unit 15. The transmission/reception circuit 14 includes a transmission circuit 16 and a reception circuit 17. The transmission circuit 16 and the reception circuit 17 are respectively connected to the transducer array 13. In addition, the transmission/reception circuit 14 transmits and receives signals to and from a processor 25 of the apparatus main body 20 via the communication unit 15.

The transducer array 13 includes a plurality of transducers (not illustrated) which are arranged in one-dimensional manner or two-dimensional manner. Each of these transducers transmits ultrasound beams UBs in accordance with a drive signal supplied from the transmission circuit 16 and receives ultrasound echoes from the living body 30. The transducer outputs a signal based on the received ultrasound echoes. The transducer is configured, for example, by forming electrodes at both ends of a piezoelectric body. The piezoelectric body includes a piezoelectric ceramic represented by lead zirconate titanate (PZT), a polymer piezoelectric element represented by poly vinylidene di fluoride (PVDF), a piezoelectric single crystal represented by lead magnesium niobate-lead titanate (PMN-PT), and the like.

The transmission circuit 16 includes, for example, a plurality of pulse generators. The transmission circuit 16 adjusts a delay amount of a drive signal based on a transmission delay pattern, which is selected according to a control signal transmitted from the processor 25 of the apparatus main body 20, and supplies the adjusted delay amount of the drive signal to the plurality of transducers included in the transducer array 13. The delay amount of the drive signal is adjusted by the transmission circuit 16 such that the ultrasound waves transmitted from the plurality of transducers form the ultrasound beams UBs. The drive signal is a pulsed or continuous voltage signal. In a case where the drive signal is applied, the transducers transmit pulsed or continuous ultrasound waves by expansion and contraction. By combining the ultrasound waves transmitted from the plurality of transducers, the ultrasound beams UBs as combined waves are formed.

In a case where the ultrasound beams UBs are transmitted into the living body 30, the ultrasound beams UBs are reflected by a part such as a blood vessel B in the living body 30. Thereby, ultrasound echoes are generated, and the ultrasound echoes propagate toward the transducer array 13. The ultrasound echoes which propagate toward the transducer array 13 in this way are received by the plurality of transducers included in the transducer array 13. In a case where the ultrasound echoes are received, the transducers generate electric signals by expansion and contraction. The electric signals generated by the transducers are output to the reception circuit 17.

Figure 4:
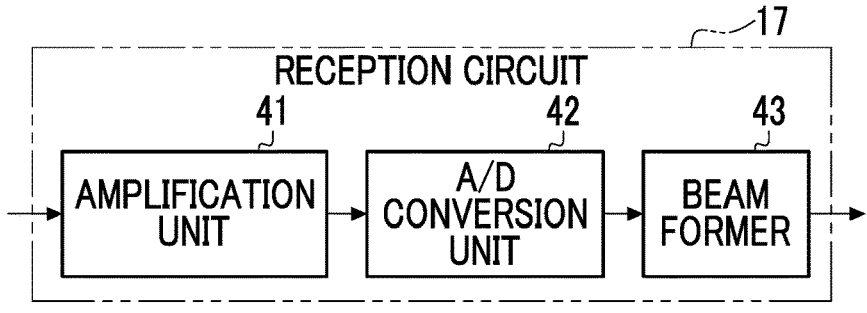
FIG. 4 is a block diagram illustrating an example of a configuration of a reception circuit.

The reception circuit 17 generates a sound wave signal by processing the electric signals output from the transducer array 13 according to a control signal transmitted from the processor 25 of the apparatus main body 20. As illustrated in FIG. 4 as an example, the reception circuit 17 is configured by connecting an amplification unit 41, an analog to digital (A/D) conversion unit 42, and a beam former 43 in series.

The amplification unit 41 amplifies the signal which is input from each of the plurality of transducers included in the transducer array 13, and transmits the amplified signal to the A/D conversion unit 42. The A/D conversion unit 42 converts the signal transmitted from the amplification unit 41 into digital reception data, and transmits the converted reception data to the beam former 43. The beam former 43 adds a delay to the reception data converted by the A/D conversion unit 42 according to a sound velocity or a sound velocity distribution which is set based on a reception delay pattern selected according to a control signal transmitted from the processor 25 of the apparatus main body 20. This addition processing is referred to as reception focus processing. By this reception focus processing, a sound wave signal, which is obtained by performing phasing addition on the reception data converted by the A/D conversion unit 42 and narrowing down a focus of the ultrasound echo, is acquired.

The apparatus main body 20 includes a display device 21, an input device 22, a communication unit 23, a storage device 24, and a processor 25. The input device 22 is, for example, a touch panel or the like incorporated in the display device 21. In a case where the apparatus main body 20 is a PC or the like, the input device 22 may be a keyboard, a mouse, a track ball, a touch pad, or the like. The communication unit 23 performs wireless communication with the communication unit 15 of the ultrasound probe 10.

The input device 22 and the storage device 24 are connected to the processor 25. The processor 25 and the storage device 24 are connected to each other so as to be able to bidirectionally exchange information.

The storage device 24 is a device that stores a program 26 or the like for operating the ultrasound diagnostic apparatus 2, and is, for example, a flash memory, a hard disc drive (HDD), or a solid state drive (SSD). In a case where the apparatus main body 20 is a PC or the like, as the storage device 24, a recording medium such as a flexible disc (FD), a magneto-optical (MO) disc, a magnetic tape, a compact disc (CD), a digital versatile disc (DVD), a secure digital (SD) card, or a Universal Serial Bus (USB) memory, a server, or the like can be used.

The processor 25 is, for example, a central processing unit (CPU). The processor 25 performs processing based on the program 26 in cooperation with a random access memory (RAM) (not illustrated) or the like, and thus the apparatus main body 20 functions as a main control unit 50, an image generation unit 51, a display control unit 52, an image analysis unit 53, and a highlight display unit 54.

The processor 25 is not limited to the CPU. The processor 25 may be configured by a field programmable gate array (FPGA), a digital signal processor (DSP), an application specific integrated circuit (ASIC), a graphics processing unit (GPU), or another integrated circuit (IC), or may be configured by a combination thereof.

The main control unit 50 controls each unit of the ultrasound diagnostic apparatus 2 based on an input operation by the operator via the input device 22. The main control unit 50 transmits the above-described control signal to the ultrasound probe 10 via the communication unit 23. The sound wave signal generated by the reception circuit 17 is input from the ultrasound probe 10 to the processor 25 via the communication unit 23.

Figure 5:
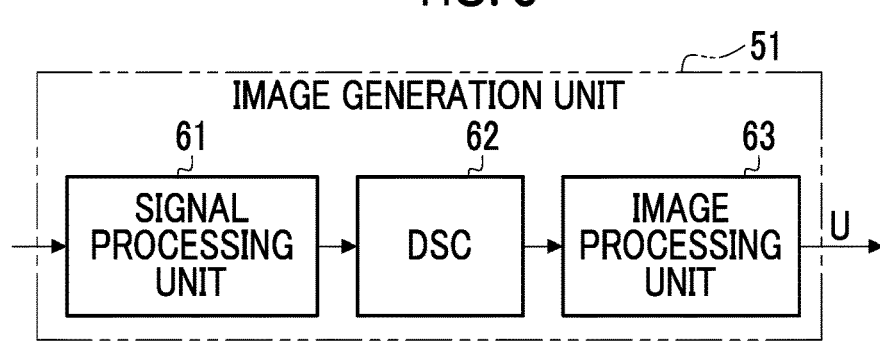
FIG. 5 is a block diagram illustrating an example of a configuration of an image generation unit.

The image generation unit 51 acquires the sound wave signal which is input from the ultrasound probe 10 under a control of the main control unit 50, and generates an ultrasound image U based on the acquired sound wave signal. As illustrated in FIG. 5 as an example, the image generation unit 51 is configured by connecting a signal processing unit 61, a digital scan converter (DSC) 62, and an image processing unit 63 in series.

The signal processing unit 61 performs, on the sound wave signal generated by the reception circuit 17, correction of attenuation due to a distance according to a depth of a reflection position of the ultrasound wave, and then performs envelope detection processing on the corrected sound wave signal. Thereby, a B-mode image signal, which is tomographic image information on a tissue in the subject, is generated.

The DSC 62 converts (so-called raster-converts) the B mode image signal generated by the signal processing unit 61 into an image signal conforming to a normal television signal scanning method. The image processing unit 63 performs various image processing such as gradation processing on the B mode image signal which is input from the DSC 62, and then outputs the B mode image signal to the display control unit 52 and the image analysis unit 53. In the following, the B mode image signal obtained by performing image processing by the image processing unit 63 is simply referred to as an ultrasound image U.

The transmission/reception circuit 14 of the ultrasound probe 10 and the image generation unit 51 are controlled by the main control unit 50 such that the ultrasound image U is periodically generated at a constant frame rate. The transmission/reception circuit 14 and the image generation unit 51 function as an image acquisition unit that acquires the ultrasound image U.

Under the control of the main control unit 50, the display control unit 52 performs predetermined processing on the ultrasound image U generated by the image generation unit 51, and causes the display device 21 to display the processed ultrasound image U.

Under the control of the main control unit 50, the image analysis unit 53 generates blood vessel information DB by performing image analysis on the ultrasound image U which is input from the image generation unit 51, and outputs the generated blood vessel information DB to the highlight display unit 54. The blood vessel information DB includes, for example, a detection result of a blood vessel region included in the ultrasound image U and a result of artery/vein determination of the detected blood vessel.

The highlight display unit 54 controls the display control unit 52 based on the blood vessel information DB which is input from the image analysis unit 53 under the control of the main control unit 50. Thereby, the blood vessel region is highlighted and displayed in the ultrasound image U displayed on the display device 21. In addition, the highlight display unit 54 displays the blood vessel region based on the artery/vein determination result such that the blood vessel included in the blood vessel region can be identified as an artery or a vein.

Figure 6:
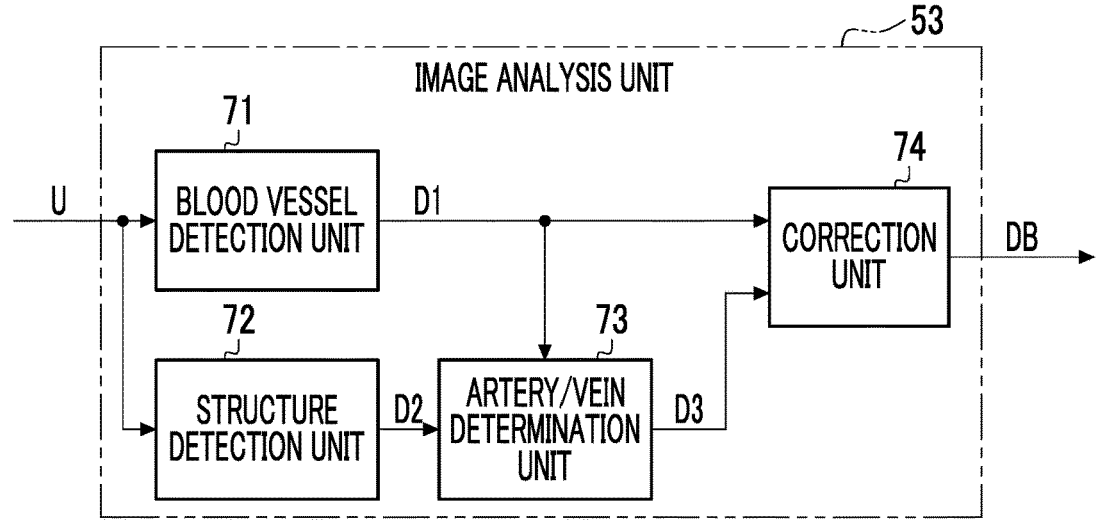
FIG. 6 is a block diagram illustrating an example of a configuration of an image analysis unit.

As illustrated in FIG. 6 as an example, the image analysis unit 53 includes a blood vessel detection unit 71, a structure detection unit 72, an artery/vein determination unit 73, and a correction unit 74. The ultrasound image U generated by the image generation unit 51 is input to the blood vessel detection unit 71 and the structure detection unit 72.

The blood vessel detection unit 71 specifies a blood vessel region by individually detecting each blood vessel included in the ultrasound image U, and performs artery/vein determination of the blood vessel included in the blood vessel region. The blood vessel detection unit 71 outputs information including a detection result of a blood vessel region and an artery/vein determination result of the blood vessel region to the correction unit 74 and the artery/vein determination unit 73, as blood vessel detection information D1. At least information on the blood vessel region detected by the blood vessel detection unit 71 may be input to the artery/vein determination unit 73.

The structure detection unit 72 detects a structure region including a structure such as a tendon, a bone, a nerve, or a muscle based on the ultrasound image U, and outputs, as structure detection information D2, information representing the detected structure region to the artery/vein determination unit 73.

The artery/vein determination unit 73 performs artery/vein determination of the blood vessel included in the blood vessel region based on an anatomical relative positional relationship between the blood vessel region included in the blood vessel detection information D1 and the structure region included in the structure detection information D2. In other words, the artery/vein determination unit 73 sets the structure region as a landmark, and performs artery/vein determination based on a relative positional relationship of the blood vessels when the landmark is set as a reference. The artery/vein determination unit 73 outputs, as artery/vein determination information D3, information representing a result of the artery/vein determination to the correction unit 74.

The correction unit 74 corrects the artery/vein determination result included in the blood vessel detection information D1 based on the artery/vein determination information D3. The correction unit 74 outputs, as the above-described blood vessel information DB, the corrected blood vessel detection information D1 to the highlight display unit 54.

Figure 7:
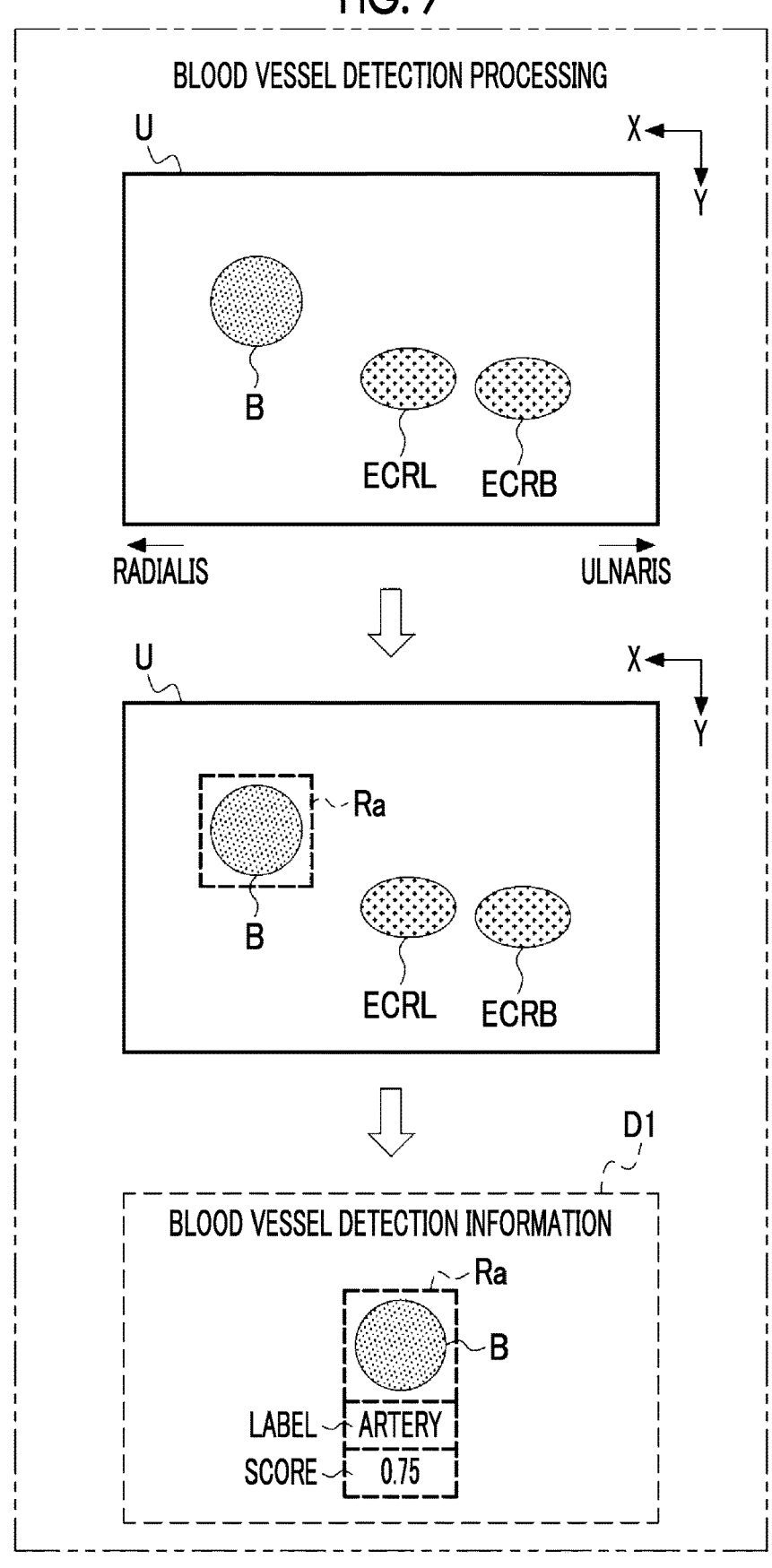
FIG. 7 is a diagram illustrating an example of blood vessel detection processing.

FIG. 7 illustrates an example of blood vessel detection processing by the blood vessel detection unit 71. The blood vessel detection unit 71 performs processing of detecting a blood vessel region Ra including a blood vessel B from the ultrasound image U by using a known algorithm, and performs artery/vein determination of the blood vessel B included in the blood vessel region Ra. In a case where the blood vessel region Ra includes a blood vessel B determined as an artery, the blood vessel region Ra is indicated by a broken line. In addition, in a case where the blood vessel region Ra includes a blood vessel B determined as a vein, the blood vessel region Ra is indicated by a solid line. The blood vessel region Ra illustrated in FIG. 7 includes a blood vessel B determined as an artery. In a case where the ultrasound image U includes a plurality of blood vessels B, the blood vessel detection unit 71 detects the blood vessel region Ra for each of the blood vessels B.

A "label" representing an artery/vein determination result and a "score" representing reliability (that is, certainty) of the artery/vein determination result are associated with the blood vessel region Ra. The label represents whether the blood vessel B included in the blood vessel region Ra is an "artery" or a "vein". The score is a value in a range equal to or larger than 0 and equal to or smaller than 1. As the score is closer to 1, the reliability is higher. The blood vessel region Ra associated with the label and the score corresponds to the above-described blood vessel detection information D1.

In the ultrasound image U illustrated in FIG. 7, in addition to the blood vessel B, an extensor carpi radialis longus (hereinafter, referred to as ECRL) and an extensor carpi radialis brevis (hereinafter, referred to as ECRB), which are present in a human wrist joint, appear. The ECRL and the ECRB are examples of structures.

In the present embodiment, the blood vessel detection unit 71 performs blood vessel detection processing using a blood vessel detection model 71A (refer to FIG. 8), which is a trained model generated by machine learning. The blood vessel detection model 71A is, for example, an object detection algorithm using deep learning. As the blood vessel detection model 71A, for example, an object detection model configured by regional CNN (R-CNN), which is a kind of convolutional neural network (CNN), can be used.

The blood vessel detection model 71A detects, as an object, a region including a blood vessel single-body from the ultrasound image U, and determines a label for the detected region. In addition, the blood vessel detection model 71A outputs information representing the detected blood vessel region Ra together with a label and a score.

Figure 8:
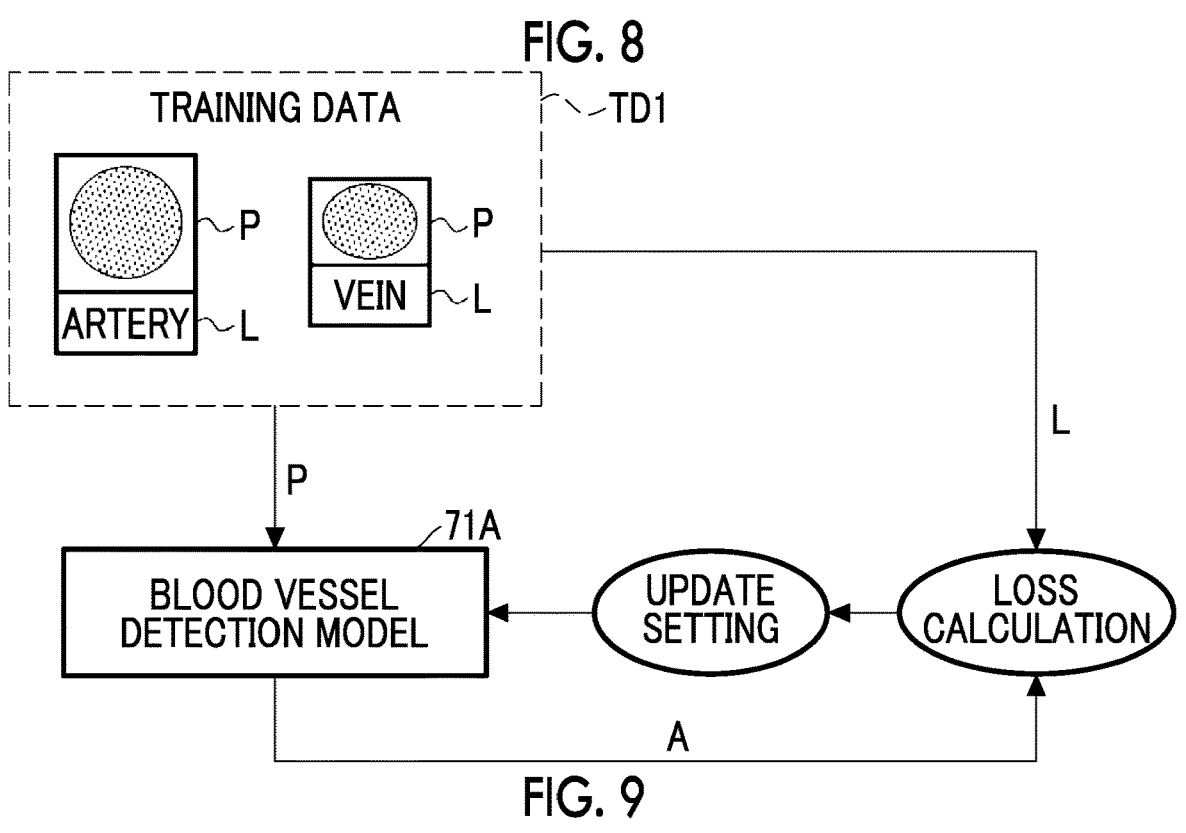
FIG. 8 is a diagram illustrating an example of a training phase in which a blood vessel detection model is trained.

FIG. 8 is a diagram illustrating an example of a training phase in which the blood vessel detection model 71A is trained by machine learning. The blood vessel detection model 71A performs training using training data TD1. The training data TD1 includes a plurality of training images P associated with correct answer labels L. The training image P included in the training data TD1 is a sample image of a blood vessel single-body (artery and vein). The training data TD1 includes various training images Pin which blood vessels have different shapes, sizes, and the like.

In the training phase, the training image P is input to the blood vessel detection model 71A. The blood vessel detection model 71A outputs a determination result A of the training image P. Loss calculation is performed using a loss function based on the determination result A and the correct answer label L. In addition, update setting of various coefficients of the blood vessel detection model 71A is performed according to a result of the loss calculation, and the blood vessel detection model 71A is updated according to the update setting.

In the training phase, a series of processing, which includes inputting of the training image P to the blood vessel detection model 71A, outputting of the determination result A from the blood vessel detection model 71A, the loss calculation, the update setting, and updating of the blood vessel detection model 71A, is repeatedly performed. The repetition of the series of processing is ended in a case where detection accuracy reaches a predetermined setting level. The blood vessel detection model 71A of which the detection accuracy reaches the setting level is stored in the storage device 24, and then is used by the blood vessel detection unit 71 in the blood vessel detection processing which is in an operation phase.

Figure 9:
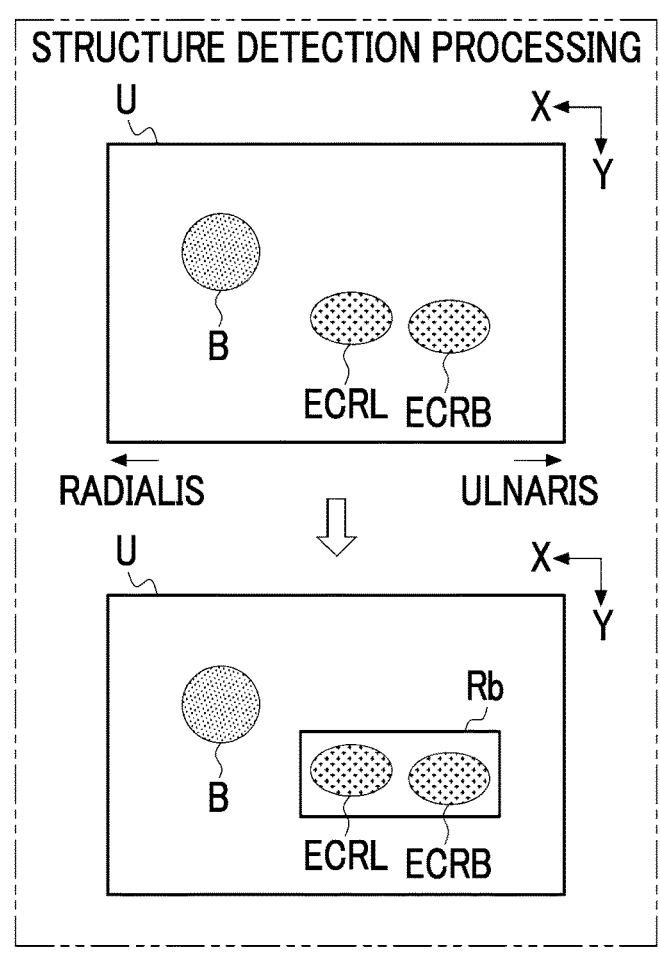
FIG. 9 is a diagram illustrating an example of structure detection processing.

FIG. 9 illustrates an example of structure detection processing by the structure detection unit 72. The structure detection unit 72 performs processing of detecting a structure region Rb including a structure from the ultrasound image U by using a known algorithm.

In the present embodiment, the structure detection unit 72 performs structure detection processing using a structure detection model 72A (refer to FIG. 10), which is a trained model generated by machine learning. The structure detection model 72A is, for example, an object detection algorithm using deep learning. As the structure detection model 72A, for example, an object detection model configured by R-CNN, which is a kind of CNN, can be used.

The structure detection unit 72 detects, as an object, a structure region Rb including a structure from the ultrasound image U. The information representing the structure region Rb corresponds to the structure detection information D2 described above. In the example illustrated in FIG. 9, the structure detection unit 72 detects, as the structure region Rb, a region including the ECRL and the ECRB. The structure detection unit 72 may individually detect, as structure regions Rb, the region including the ECRL and the region including the ECRB.

Figure 10:
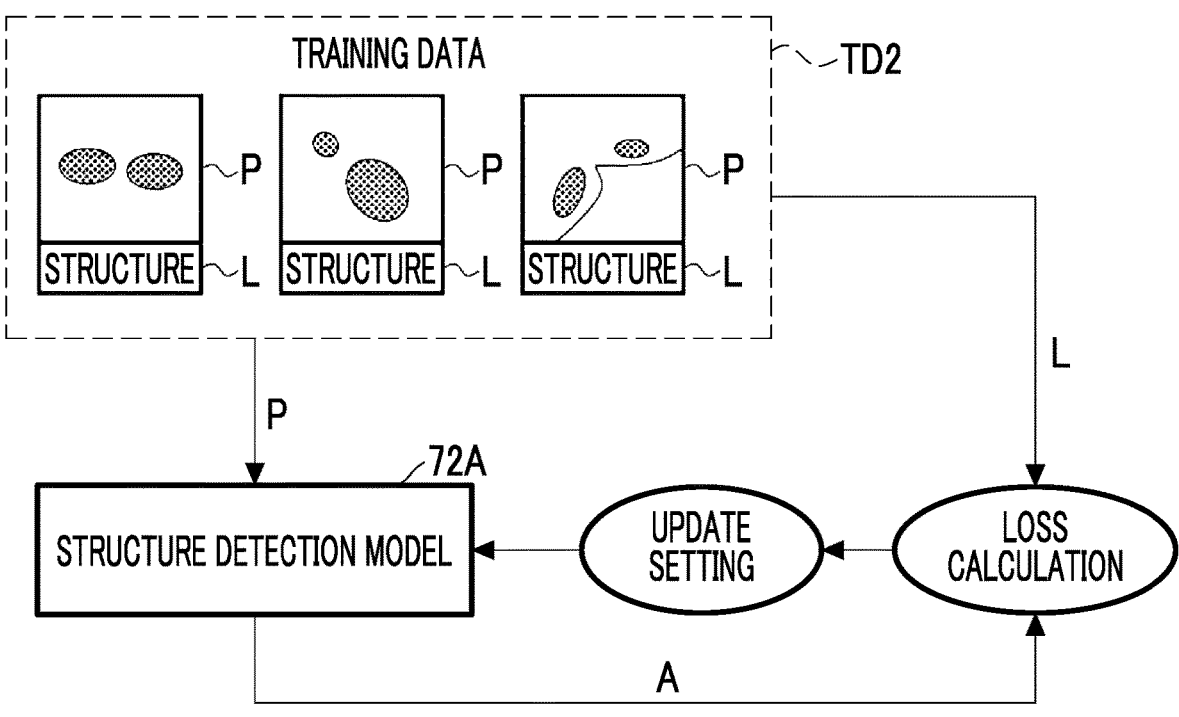
FIG. 10 is a diagram illustrating an example of a training phase in which a structure detection model is trained.

FIG. 10 is a diagram illustrating an example of a training phase in which the structure detection model 72A is trained by machine learning. The structure detection model 72A performs training using training data TD2. The training data TD2 includes a plurality of training images P associated with correct answer labels L. The training image P included in the training data TD2 is a sample image of a structure. The training data TD2 includes training images P of various structures having different types (such as tendons, bones, nerves, or muscles), numbers, shapes, sizes, textures, and the like of biological tissues.

In the training phase, the training image P is input to the structure detection model 72A. The structure detection model 72A outputs a determination result A of the training image P. Loss calculation is performed using a loss function based on the determination result A and the correct answer label L. In addition, update setting of various coefficients of the structure detection model 72A is performed according to a result of the loss calculation, and the structure detection model 72A is updated according to the update setting.

In the training phase, a series of processing, which includes inputting of the training image P to the structure detection model 72A, outputting of the determination result A from the structure detection model 72A, the loss calculation, the update setting, and updating of the structure detection model 72A, is repeatedly performed. The repetition of the series of processing is ended in a case where detection accuracy reaches a predetermined setting level. The structure detection model 72A of which the detection accuracy reaches the setting level is stored in the storage device 24, and then is used by the structure detection unit 72 in the structure detection processing which is in an operation phase.

Figure 11:
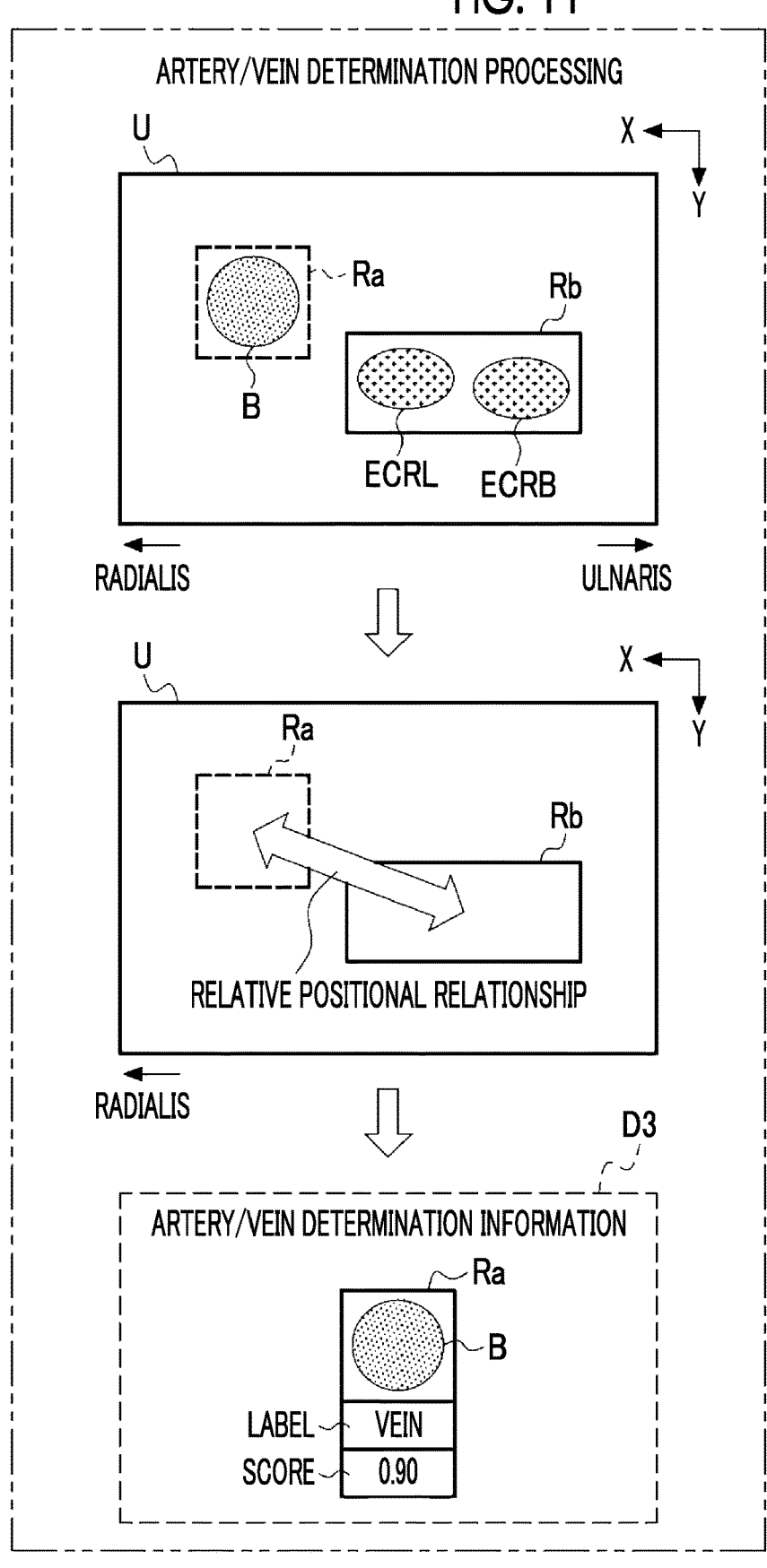
FIG. 11 is a diagram illustrating an example of artery/vein determination processing.

FIG. 11 illustrates an example of artery/vein determination processing by the artery/vein determination unit 73. The artery/vein determination unit 73 performs artery/vein determination of the blood vessel B included in the blood vessel region Ra based on an anatomical relative positional relationship between the blood vessel region Ra included in the blood vessel detection information D1 and the structure region Rb included in the structure detection information D2. The artery/vein determination unit 73 obtains, as a label for the blood vessel B, a score for each of "artery" and "vein", and selects the label having a higher score. The artery/vein determination unit 73 generates artery/vein determination information D3 by obtaining the label and the score for the blood vessel B included in the blood vessel region Ra.

The artery/vein determination unit 73 performs artery/vein determination processing by using, for example, a trained model obtained by performing training using training data representing an anatomical relative positional relationship between the blood vessel region Ra and the structure region Rb. The artery/vein determination unit 73 may perform artery/vein determination using known data representing an anatomical relative positional relationship.

The blood vessel region Ra illustrated in FIG. 11 is located on radialis (that is, a radius side) with respect to the structure region Rb including the ECRL and the ECRB, and thus the blood vessel B included in the blood vessel region Ra is determined as a vein (specifically, a cephalic vein). In this way, artery/vein determination of the blood vessel is performed using the anatomical relative positional relationship between the blood vessel and the structure, and thus accuracy of the artery/vein determination is improved.

Figure 12:
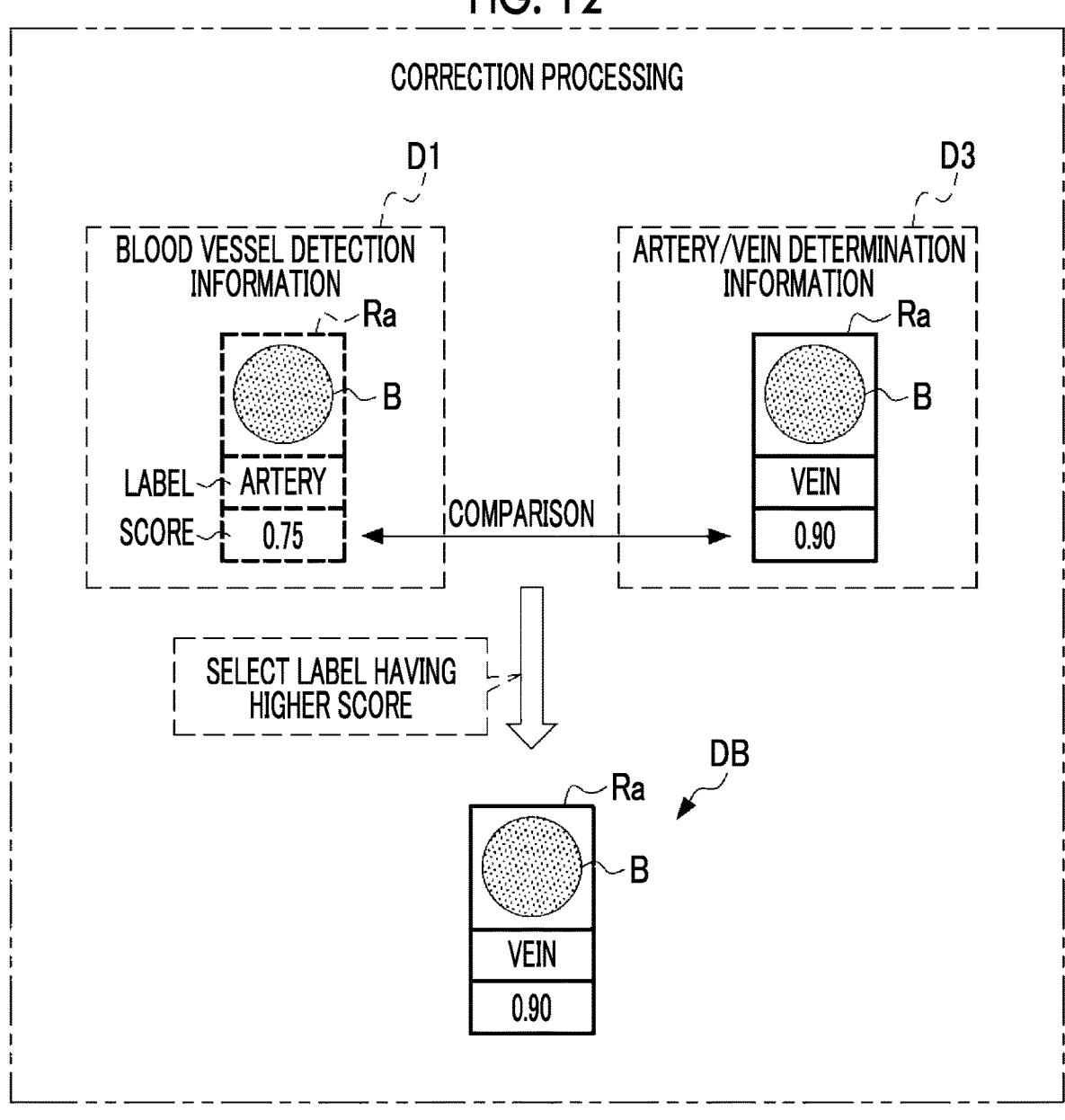
FIG. 12 is a diagram illustrating an example of correction processing.

FIG. 12 illustrates an example of correction processing performed by the correction unit 74. The correction unit 74 compares, for the corresponding blood vessel B, the score included in the artery/vein determination information D3 with the score included in the blood vessel detection information D1, and selects the label having a higher score. For example, in the example illustrated in FIG. 12, for the blood vessel B, the score (0.90) included in the artery/vein determination information D3 is higher than the score (0.75) included in the blood vessel detection information D1. Therefore, the correction unit 74 selects, as the label of the blood vessel B, the label (vein) included in the artery/vein determination information D3 instead of the label (artery) included in the blood vessel detection information D1.

In this way, in a case where the score included in the artery/vein determination information D3 is higher than the score included in the blood vessel detection information D1, the label included in the blood vessel detection information D1 is corrected.

The correction unit 74 outputs, as the above-described blood vessel information DB, the corrected blood vessel detection information D1 in which the label is corrected to the highlight display unit 54. The blood vessel information DB includes position information of the blood vessel region Ra in the ultrasound image U, and the label and the score for the blood vessel region Ra.

Figure 13:
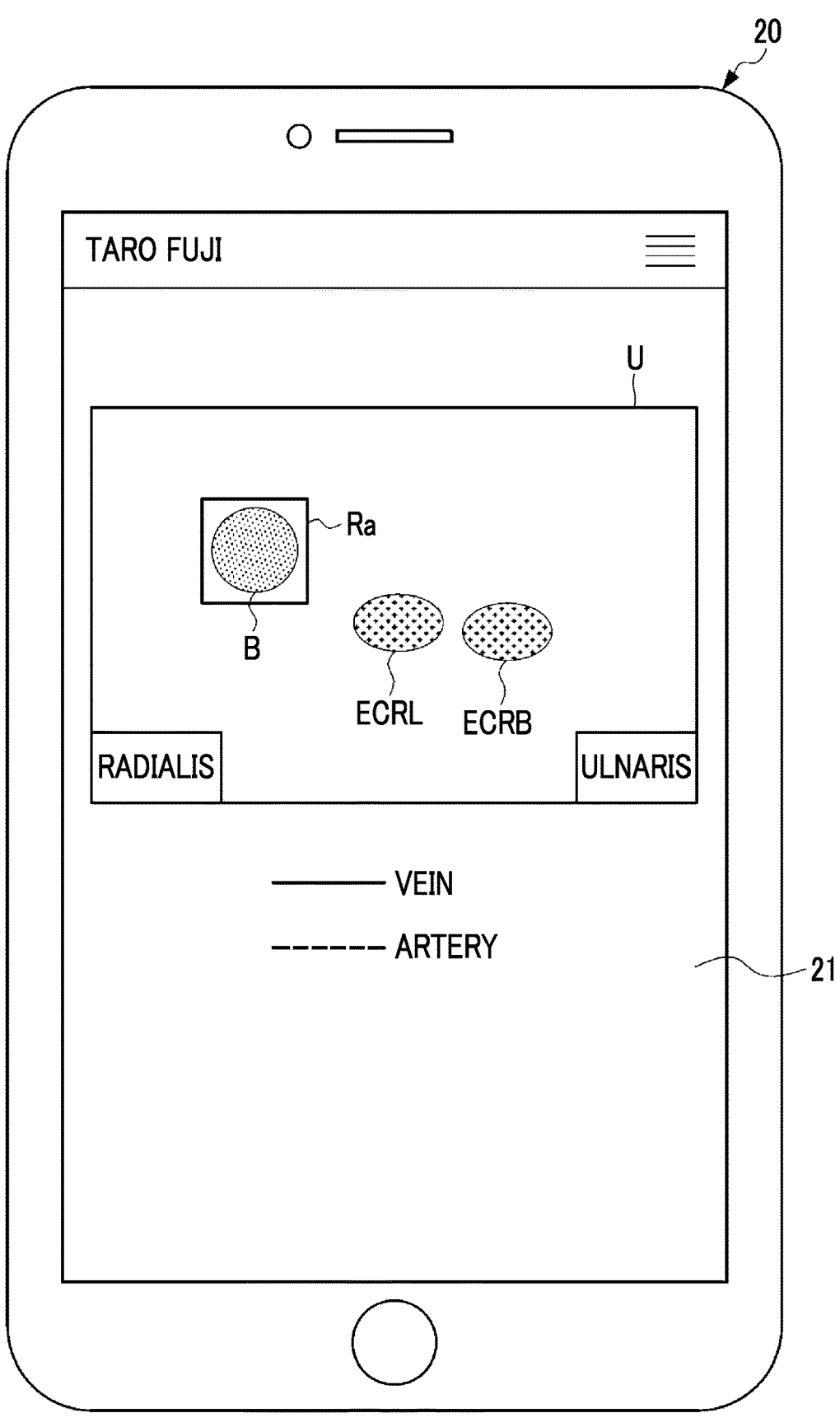
FIG. 13 is a diagram illustrating an example of highlight display processing.

FIG. 13 illustrates an example of highlight display processing by the highlight display unit 54. The highlight display unit 54 displays the blood vessel region Ra in the ultrasound image U displayed on the display device 21 of the apparatus main body 20 based on the blood vessel information DB by using a rectangular frame. In addition, the highlight display unit 54 displays the blood vessel region Ra based on the artery/vein determination result such that the blood vessel included in the blood vessel region Ra can be identified as an artery or a vein. In the example illustrated in FIG. 13, the blood vessel region Ra including a vein is indicated by a solid line, and the blood vessel region Ra including an artery is indicated by a broken line. The highlight display unit 54 may display the blood vessel region Ra such that the blood vessel region Ra can be identified according to a thickness of a line, a color of a line, brightness of a line, or the like without being limited to the line type.

Figure 14:
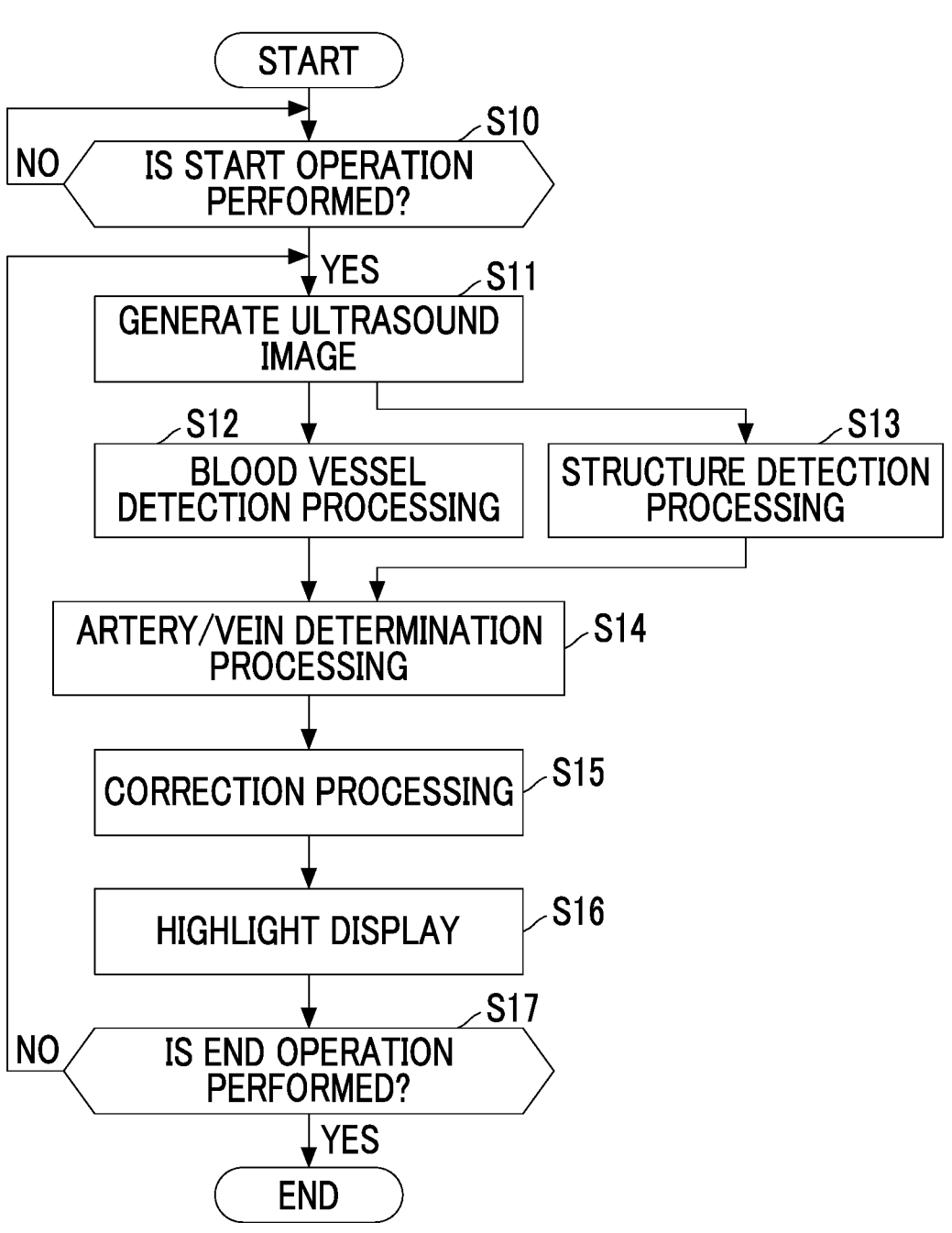
FIG. 14 is a flowchart illustrating an example of an operation of the ultrasound diagnostic apparatus.

Next, an example of an operation of the ultrasound diagnostic apparatus 2 will be described with reference to a flowchart illustrated in FIG. 14. First, the main control unit 50 determines whether or not a start operation is performed by the operator using the input device 22 or the like (step S10). In a case where it is determined that a start operation is performed (YES in step S10), the main control unit 50 generates the ultrasound image U by operating the transmission/reception circuit 14 of the ultrasound probe 10 and the image generation unit 51 (step S11). The generated ultrasound image U is displayed on the display device 21 by the display control unit 52.

At this time, as illustrated in FIG. 2, the operator brings the ultrasound probe 10 into contact with the surface of the living body 30. The ultrasound beams UBs are transmitted from the transducer array 13 into the living body 30 according to the drive signal which is input from the transmission circuit 16. The ultrasound echo from the living body 30 is received by the transducer array 13, and the received signal is output to the reception circuit 17. The received signal which is received by the reception circuit 17 is processed via the amplification unit 41, the A/D conversion unit 42, and the beam former 43, and thus a sound wave signal is generated. The sound wave signal is output to the apparatus main body 20 via the communication unit 15.

The apparatus main body 20 receives the sound wave signal which is output from the ultrasound probe 10 via the communication unit 23. The sound wave signal which is received by the apparatus main body 20 is input to the image generation unit 51. In the image generation unit 51, a B-mode image signal is generated by performing envelope detection processing on the sound wave signal by the signal processing unit 61, and the B-mode image signal is subjected to the DSC 62 and the image processing unit 63. Thus, an ultrasound image U is output to the display control unit 52. Further, the ultrasound image U is output to the image analysis unit 53.

In the image analysis unit 53, the blood vessel detection processing (refer to FIG. 7) is performed by the blood vessel detection unit 71 (step S12). The blood vessel detection information D1 generated by the blood vessel detection processing is output to the correction unit 74 and the artery/vein determination unit 73.

In addition, step S13 is performed in parallel with step S12. In step S13, the structure detection processing (refer to FIG. 9) is performed by the structure detection unit 72. The structure detection information D2 generated by the structure detection processing is output to the artery/vein determination unit 73. In step S14, the artery/vein determination processing (refer to FIG. 11) is performed by the artery/vein determination unit 73. The artery/vein determination information D3 generated by the artery/vein determination processing is output to the correction unit 74.

Next, the correction processing (refer to FIG. 12) is performed by the correction unit 74 (step S15). In the correction processing, the label for the blood vessel region Ra included in the blood vessel detection information D1 is corrected based on the artery/vein determination information D3. As a result of the correction processing, the blood vessel information DB is output to the highlight display unit 54.

In addition, the highlight display processing (refer to FIG. 13) is performed by the highlight display unit 54 (step S16). By the highlight display processing, the blood vessel region Ra is highlighted and displayed in the ultrasound image U displayed on the display device 21. In addition, the blood vessel region Ra is displayed such that the blood vessel included in the blood vessel region Ra can be identified as an artery or a vein. In this way, by performing highlight display, the operator can accurately recognize the position of the blood vessel in the ultrasound image U, and can accurately recognize whether the blood vessel is an artery or a vein.

Next, the main control unit 50 determines whether or not an end operation is performed by the operator using the input device 22 or the like (step S17). In a case where it is determined that an end operation is not performed (NO in step S17), the main control unit 50 returns the processing to step S11. Thereby, a new ultrasound image U is generated. On the other hand, in a case where it is determined that an end operation is performed (YES in step S17), the main control unit 50 ends the operation of the ultrasound diagnostic apparatus 2.

In the related art, a blood vessel is detected by blood vessel detection processing, and artery/vein determination is individually performed on the detected blood vessel. In such a method, an error often occurs in the artery/vein determination of the blood vessel, and a result of the artery/vein determination may change for each frame. In a case where the operator attempts to perform puncture based on the result of the artery/vein determination, the blood vessel to be punctured may be mistaken.

On the other hand, according to the technique of the present disclosure, artery/vein determination of the blood vessel is performed using the anatomical relative positional relationship between the blood vessel and the structure which are detected from the ultrasound image, and thus accuracy of the artery/vein determination is improved. Thereby, the operator can accurately recognize the blood vessel (for example, a vein) to be punctured.

Next, examples of blood vessel detection processing, structure detection processing, artery/vein determination processing, correction processing, and highlight display processing for an ultrasound image U different from the ultrasound image U illustrated in FIG. 7 will be described with reference to FIG. 15 to FIG. 19.

Figure 15:
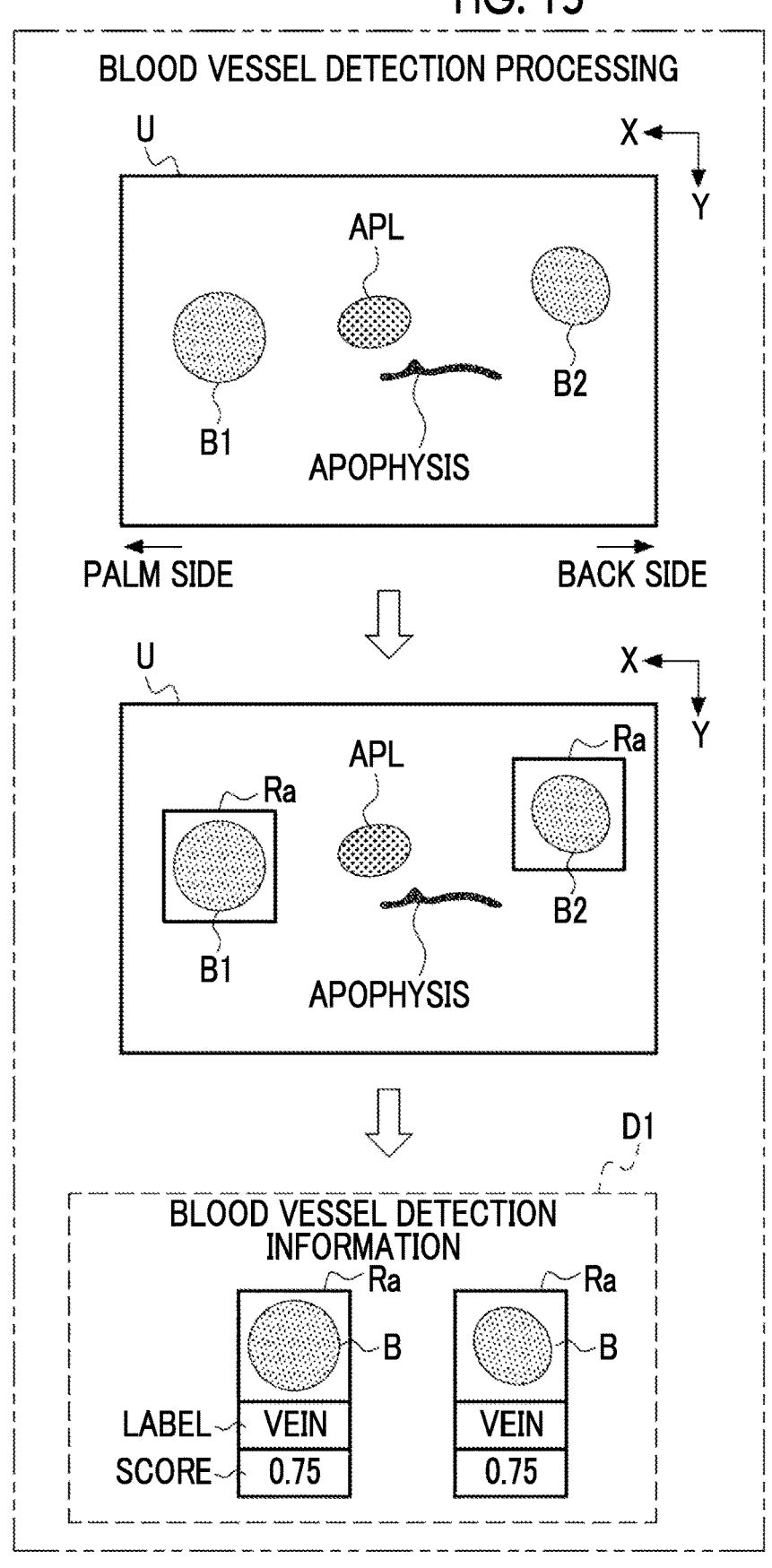
FIG. 15 is a diagram illustrating an example of blood vessel detection processing for another ultrasound image.

As illustrated in FIG. 15, two blood vessels B1 and B2 appear in the ultrasound image U according to the present example. In addition, in the ultrasound image U, an abductor pollicis longus (hereinafter, referred to as APL) and a radius styloid process (hereinafter, simply referred to as an apophysis) appear. The APL and the apophysis are examples of structures.

In the blood vessel detection processing, the blood vessel detection unit 71 detects, as the blood vessel region Ra, each of the region including the blood vessel B1 and the region including the blood vessel B2 in the ultrasound image U, and associates a label and a score with each of the blood vessel regions Ra. The two blood vessel regions Ra associated with the label and the score correspond to the above-described blood vessel detection information D1. In the present example, the labels of the blood vessels B1 and B2 are both determined as a "vein".

Figure 16:
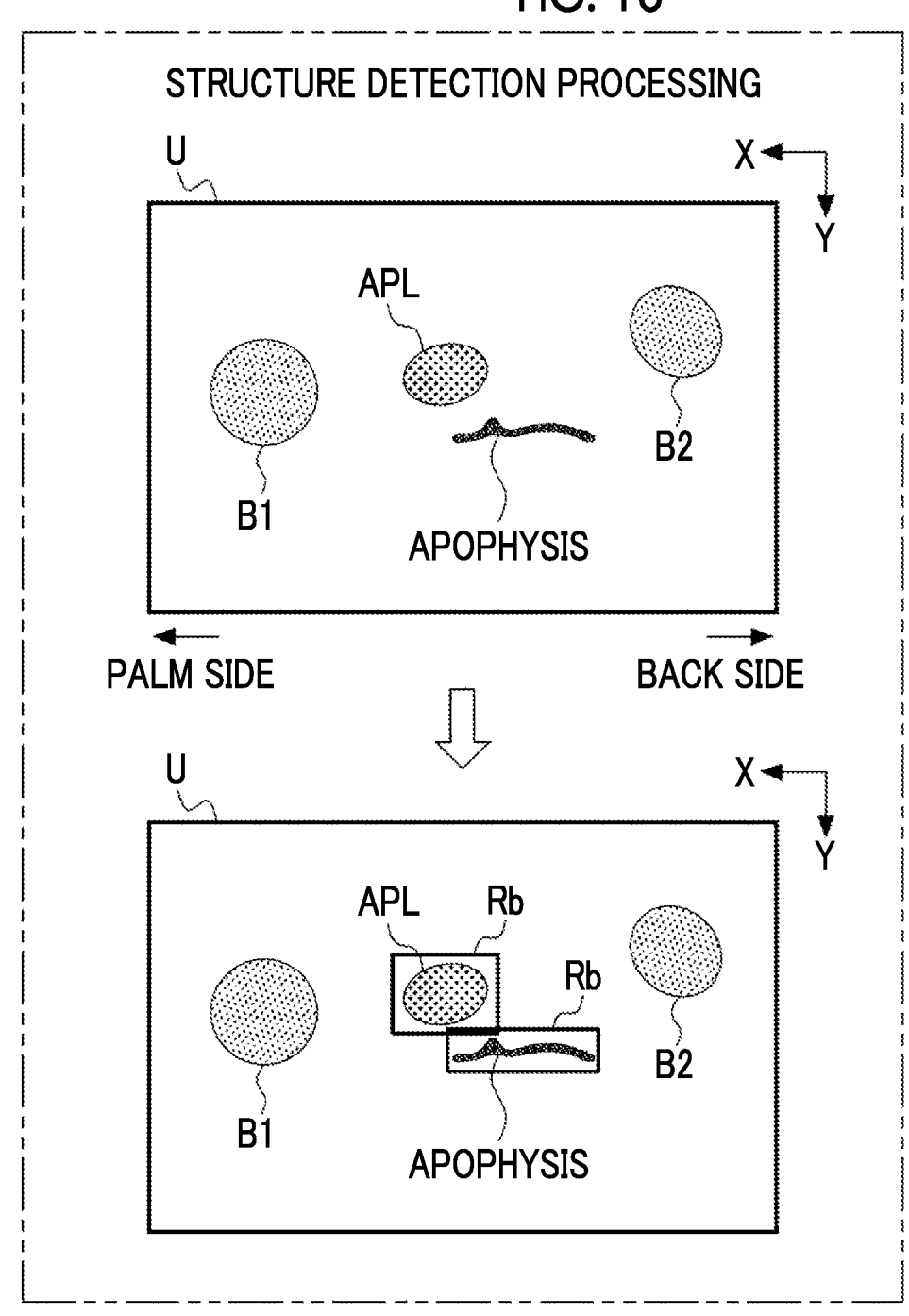
FIG. 16 is a diagram illustrating an example of structure detection processing for another ultrasound image.

As illustrated in FIG. 16, in the structure detection processing, the structure detection unit 72 detects, as the structure region Rb, each of the region including the APL and the region including the apophysis in the ultrasound image U. The information representing the two structure region Rb corresponds to the structure detection information D2 described above.

Figure 17:
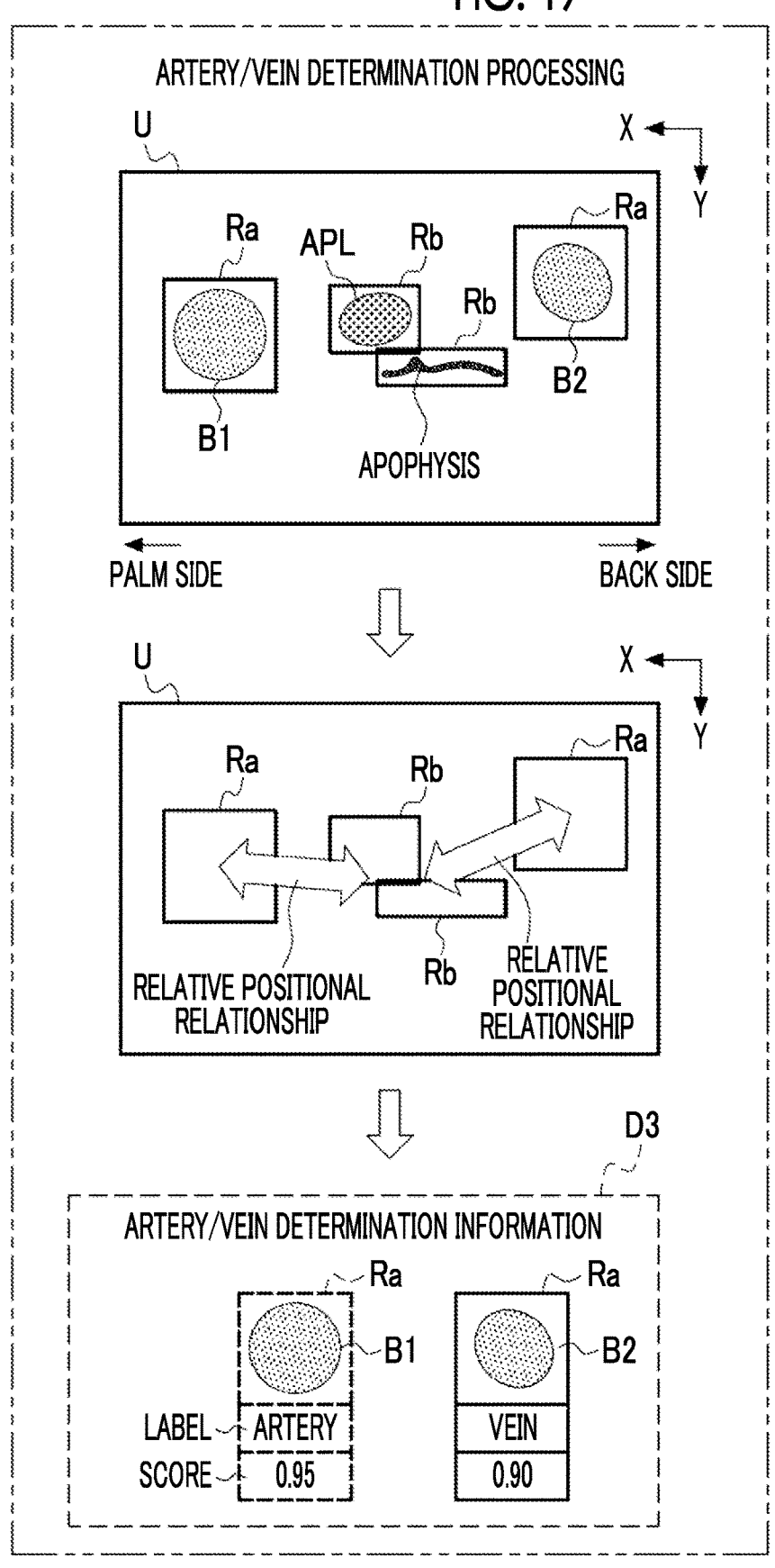
FIG. 17 is a diagram illustrating an example of artery/vein determination processing for another ultrasound image.

As illustrated in FIG. 17, in the artery/vein determination processing, the artery/vein determination unit 73 performs artery/vein determination on each of the two blood vessel regions Ra based on an anatomical relative positional relationship between the blood vessel region and the two structure regions Rb. The artery/vein determination unit 73 generates artery/vein determination information D3 by obtaining the label and the score for each of the blood vessels B1 and B2.

Figure 18:
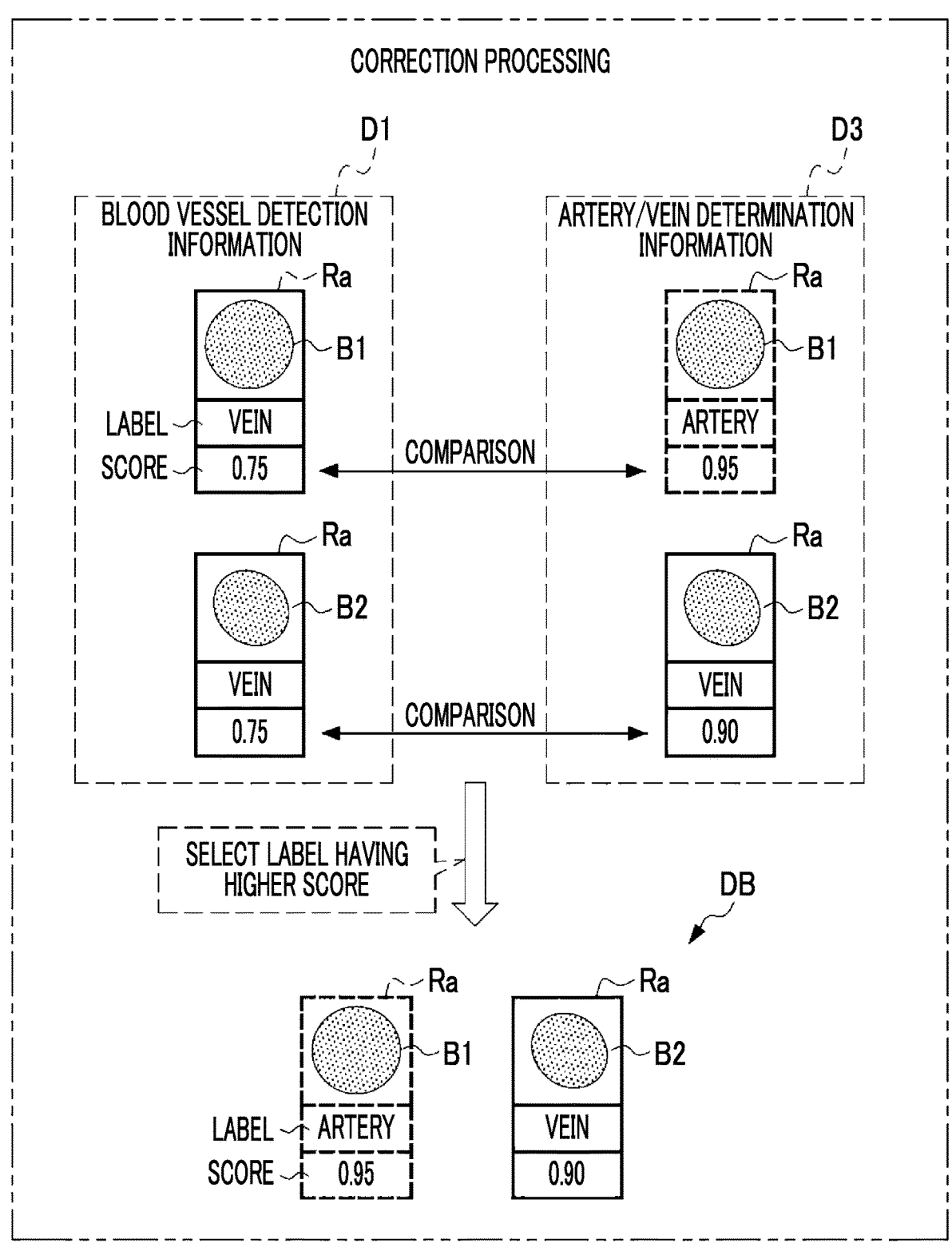
FIG. 18 is a diagram illustrating an example of correction processing for another ultrasound image.

As illustrated in FIG. 18, in the correction processing, the correction unit 74 compares the score included in the artery/vein determination information D3 with the score included in the blood vessel detection information D1 for each of the blood vessels B1 and B2, and selects the label having a higher score. In the present example, for both the blood vessels B1 and B2, the score included in the artery/vein determination information D3 is higher than the score included in the blood vessel detection information D1, and thus the label included in the artery/vein determination information D3 is selected. In the present example, in the labels of the blood vessels B1 and B2 included in the blood vessel detection information D1, the label of the blood vessel B1 is corrected from "vein" to "artery".

Figure 19:
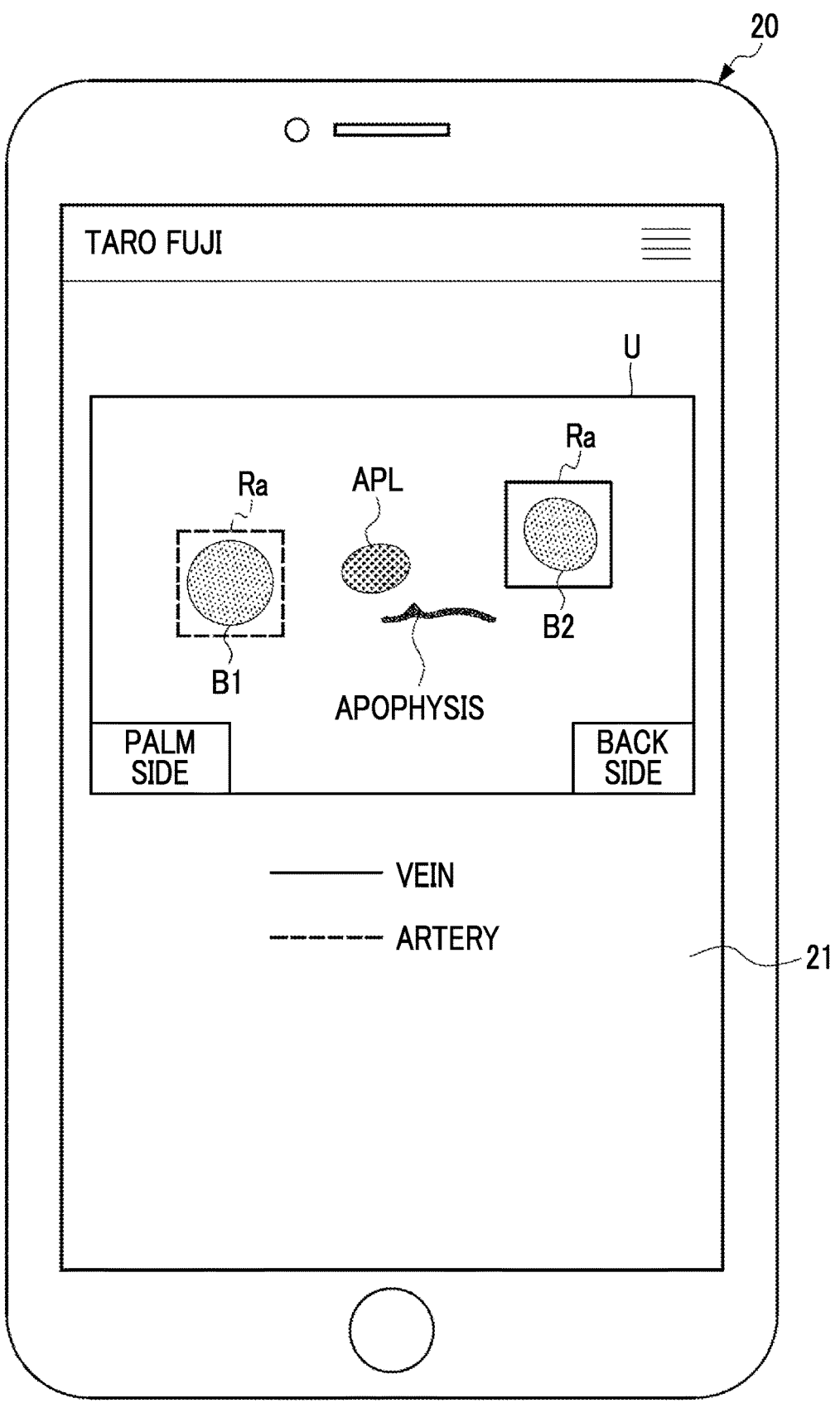
FIG. 19 is a diagram illustrating an example of highlight display processing for another ultrasound image.

As illustrated in FIG. 19, in the highlight display processing, the blood vessel region Ra is highlighted and displayed in the ultrasound image U based on the corrected label. In the present example, the blood vessel region Ra including the blood vessel B1 determined as "artery" is indicated by a broken line, and the blood vessel region Ra including the blood vessel B2 determined as "vein" is indicated by a solid line.

Modification Example

Hereinafter, various modification examples of the ultrasound diagnostic apparatus 2 according to the first embodiment will be described.

Figure 20:
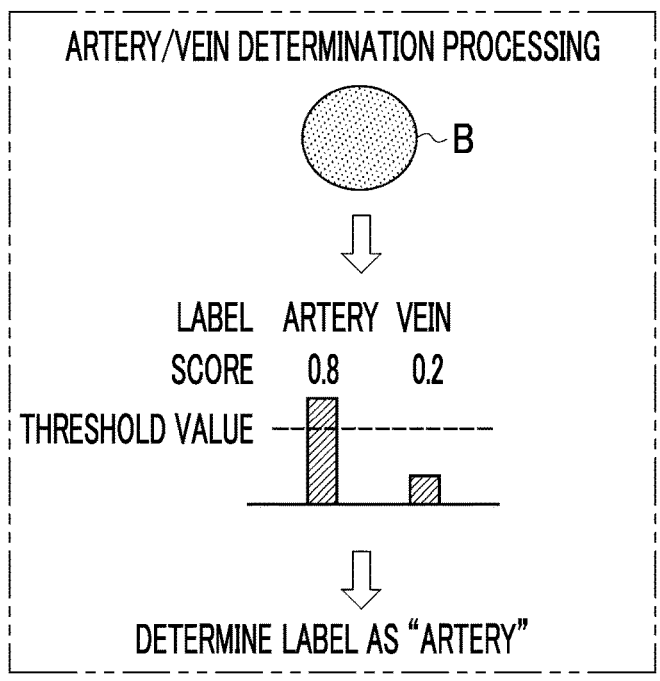
FIG. 20 is a diagram illustrating a modification example of artery/vein determination processing.

In the first embodiment, the artery/vein determination unit 73 obtains, as the label for the blood vessel B, a score for each of "artery" and "vein" in the artery/vein determination processing (refer to FIG. 11), and selects the label having a higher score. Instead, for example, as illustrated in FIG. 20, a threshold value for a score may be set, and a label having a score equal to or higher than the threshold value may be selected.

Figure 21:
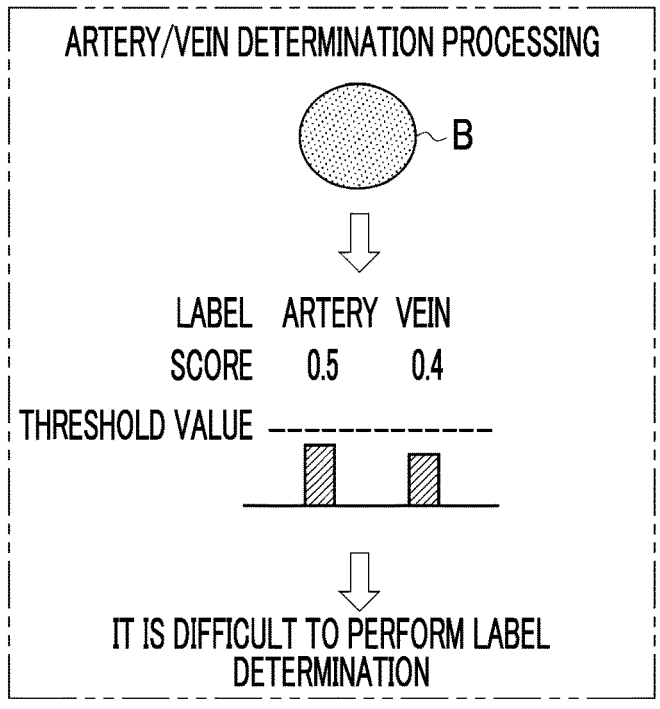
FIG. 21 is a diagram illustrating a modification example of artery/vein determination processing.

In addition, for example, as illustrated in FIG. 21, in a case where the score is obtained for each of "artery" and "vein" as the label for the blood vessel B, both scores may be lower than the threshold value. This corresponds to low accuracy of the artery/vein determination based on the relative positional relationship between the blood vessel and the structure. In this case, it is difficult to perform label determination (that is, artery/vein determination). Thus, the artery/vein determination unit 73 may stop artery/vein determination. In such a case where it is difficult to perform artery/vein determination, the highlight display unit 54 may display the blood vessel region Ra in the ultrasound image U without distinguishing whether the blood vessel region Ra is an "artery" or a "vein". In this case, the highlight display unit 54 may simply display the blood vessel region Ra as a "blood vessel".

In addition, in a case where a structure is not found from the ultrasound image U by the structure detection processing, the highlight display unit 54 may display the blood vessel region Ra in the ultrasound image U without distinguishing whether the blood vessel region Ra is an "artery" or a "vein".

In addition, in a case where a structure is not found from the ultrasound image U by the structure detection processing, or in a case where accuracy of the artery/vein determination based on the relative positional relationship between the blood vessel and the structure is low, the highlight display unit 54 may perform highlight display based on the label included in the blood vessel detection information D1.

Figure 22:
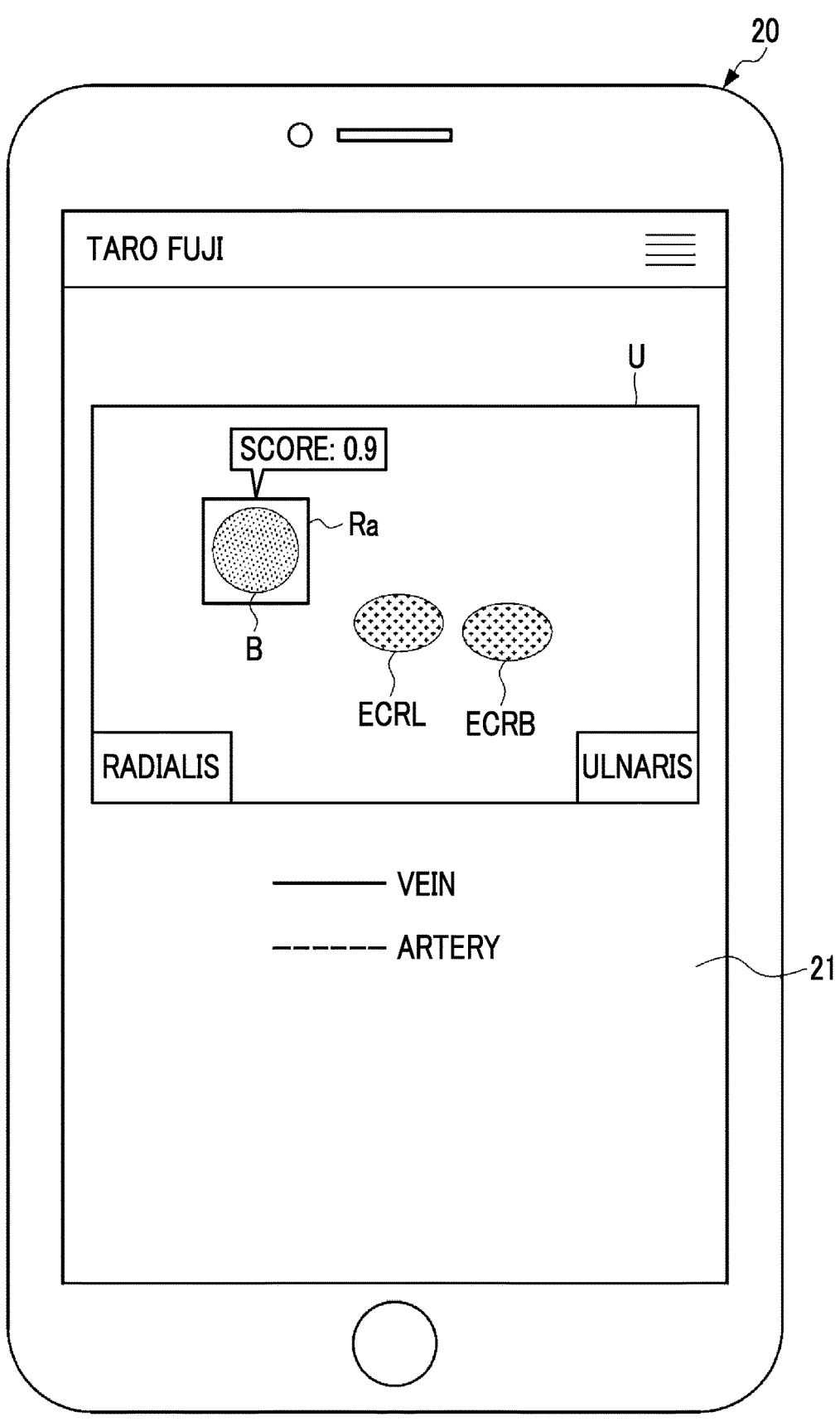
FIG. 22 is a diagram illustrating an example of displaying a score.

In addition, as illustrated in FIG. 22, for example, the highlight display unit 54 may display the score for the label selected by the correction unit 74 (that is, reliability for the determination result selected by the correction unit 74) in association with the blood vessel region Ra. Thereby, the operator can recognize the reliability of the artery/vein determination for each blood vessel.

Figure 23:
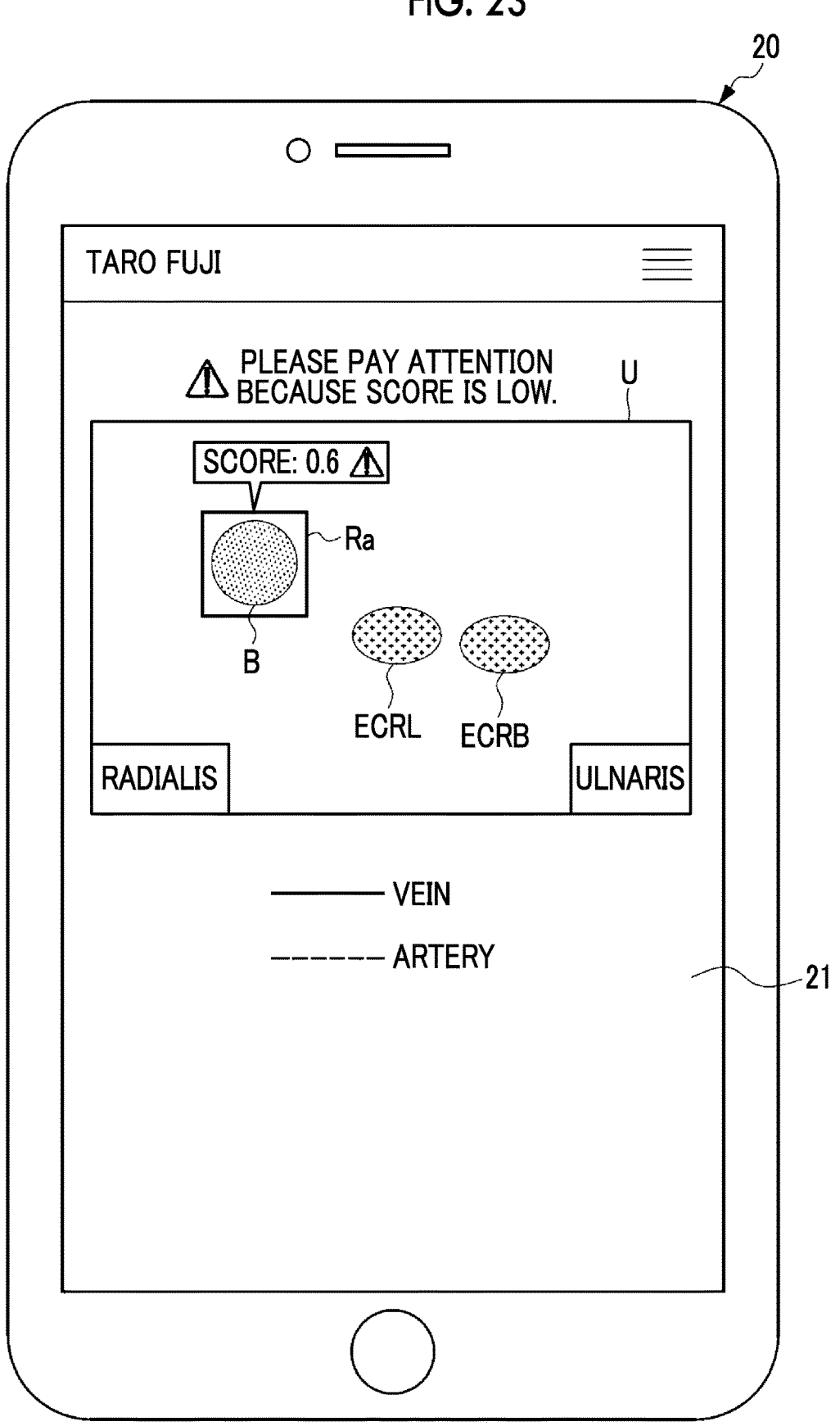
FIG. 23 is a diagram illustrating an example of displaying a message urging an operator to pay attention.

In addition, as illustrated in FIG. 23, for example, the highlight display unit 54 may display a message urging the operator to pay attention in a case where the score for the label selected by the correction unit 74 (that is, reliability for the determination result selected by the correction unit 74) is lower than a certain value. Thereby, the operator can reliably recognize that reliability of the artery/vein determination is low and caution is required in the puncture.

In addition, the artery/vein determination unit 73 may change the criterion for the artery/vein determination according to a type or the like of the structure detected by the structure detection unit 72. This is because, for example, in a case where the structure has anatomically typical features in relation to the blood vessel, there is a high possibility that the determination result is correct even when the score of the artery/vein determination is low. The artery/vein determination unit 73 changes the threshold value for the score (refer to FIG. 21) according to, for example, a type or the like of the structure. Specifically, in a case where the structure has anatomically typical features in relation to the blood vessel, the threshold value is set to be lower than the threshold value in a case where the structure does not have anatomically typical features. The criterion for the artery/vein determination is not limited to the threshold value for the score, and may be changed by changing the algorithm for the artery/vein determination.

In addition, in the first embodiment, the labels for the blood vessel are two types of "artery" and "vein". On the other hand, the labels may be further subdivided. For example, "vein" is subdivided into a "cephalic vein", a "basilic vein", and the like. Thereby, the artery/vein determination unit 73 can specify the type of the blood vessel in addition to the artery/vein determination. In this case, the highlight display unit 54 may display the type of the blood vessel in association with the blood vessel region Ra.

In addition, in the first embodiment, the blood vessel detection unit 71 performs the artery/vein determination of the blood vessel. On the other hand, the blood vessel detection unit 71 may perform only detection of the blood vessel region Ra without performing the artery/vein determination. In this case, the correction unit 74 that corrects the result of the artery/vein determination by the blood vessel detection unit 71 is not required.

In addition, in the first embodiment, the blood vessel detection unit 71 and the structure detection unit 72 are respectively configured by individual object detection models. On the other hand, the blood vessel detection unit 71 and the structure detection unit 72 can be configured by one object detection model. In this case, the object detection model may be trained using training data including a training image of the blood vessel single-body and a training image of the structure. In addition, the blood vessel detection unit 71, the structure detection unit 72, and the artery/vein determination unit 73 can be configured by one object detection model. Further, the blood vessel detection unit 71, the structure detection unit 72, the artery/vein determination unit 73, and the correction unit 74 can be configured by one object detection model.

In addition, in the first embodiment, the blood vessel detection unit 71 and the structure detection unit 72 are configured by an object detection model of a CNN. On the other hand, the object detection model is not limited to the CNN, and segmentation or another general detection model may be used.

In addition, the object detection model including the blood vessel detection unit 71 and the structure detection unit 72 may be configured by an identifier that identifies an object based on an image feature amount such as AdaBoost or a support vector machine (SVM). In this case, after the training image is converted into a feature amount vector, the identifier may be trained based on the feature amount vector.

In addition, the blood vessel detection unit 71 and the structure detection unit 72 are not limited to the object detection model by machine learning, and may perform object detection by template matching. In this case, the blood vessel detection unit 71 stores, as a template, typical pattern data of a blood vessel single-body in advance, and calculates a similarity to the pattern data while searching for the ultrasound images U by using the template. In addition, the blood vessel detection unit 71 specifies, as a blood vessel region Ra, a portion where the similarity is equal to or higher than a certain level and is maximized. Further, the structure detection unit 72 stores, as a template, typical pattern data of a structure in advance, and calculates a similarity to the pattern data while searching for the ultrasound images U by using the template. In addition, the structure detection unit 72 specifies, as a blood vessel region Ra, a portion where the similarity is equal to or higher than a certain level and is maximized. The template may be a part of an actual ultrasound image, or may be an image drawn by modeling a blood vessel or a structure.

Further, in order to calculate the similarity, in addition to simple template matching, for example, a machine learning method, which is described in Csurka et al.: Visual Categorization with Bags of Keypoints, Proc. of ECCV Workshop on Statistical Learning in Computer Vision, pp. 59-74 (2004), or a general image recognition method using deep learning, which is described in Krizhevsk et al.: ImageNet Classification with Deep Convolutional Neural Networks, Advances in Neural Information Processing Systems 25, pp. 1106-1114 (2012), can be used.

In the first embodiment, the ultrasound probe 10 and the apparatus main body 20 are connected by wireless communication. Instead, the ultrasound probe 10 and the apparatus main body 20 may be connected by wire.

Further, in the first embodiment, the image generation unit 51 that generates an ultrasound image U based on the sound wave signal is provided in the apparatus main body 20. Instead, the image generation unit 51 may be provided in the ultrasound probe 10. In this case, the ultrasound probe 10 generates an ultrasound image U and outputs the ultrasound image U to the apparatus main body 20. The processor 25 of the apparatus main body 20 performs image analysis or the like based on the ultrasound image U which is input from the ultrasound probe 10.

Further, in the first embodiment, the display device 21, the input device 22, and the ultrasound probe 10 are directly connected to the processor 25. On the other hand, the display device 21, the input device 22, and the ultrasound probe 10 may be indirectly connected to the processor 25 via a network.

Figures 24, 25:
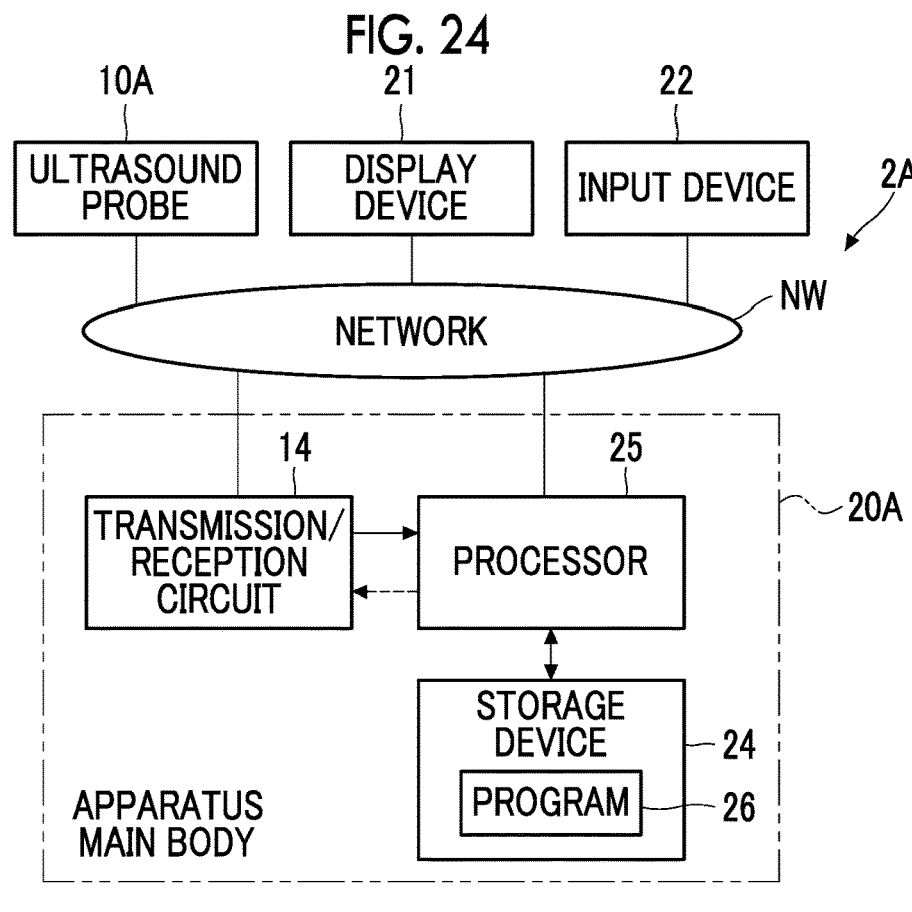
FIG. 24 is a diagram illustrating a first modification example of the ultrasound diagnostic apparatus.
FIG. 25 is a diagram illustrating a second modification example of the ultrasound diagnostic apparatus.

As an example, in the ultrasound diagnostic apparatus 2A illustrated in FIG. 24, the display device 21, the input device 22, and the ultrasound probe 10A are connected to the apparatus main body 20A via a network NW. The apparatus main body 20A is obtained by removing the display device 21 and the input device 22 from the apparatus main body 20 according to the first embodiment and adding the transmission/reception circuit 14, and is configured by the transmission/reception circuit 14, the storage device 24, and the processor 25. The ultrasound probe 10A is obtained by removing the transmission/reception circuit 14 from the ultrasound probe 10 according to the first embodiment.

In this way, in the ultrasound diagnostic apparatus 2A, the display device 21, the input device 22, and the ultrasound probe 10A are connected to the apparatus main body 20A via the network NW, and thus the apparatus main body 20A can be used as a so-called remote server. Thereby, for example, the operator can prepare the display device 21, the input device 22, and the ultrasound probe 10A at the operator's hand, and thus convenience is improved. In addition, in a case where the display device 21 and the input device 22 are configured by a mobile terminal such as a smartphone or a tablet terminal, convenience is further improved.

As another example, in the ultrasound diagnostic apparatus 2B illustrated in FIG. 25, the display device 21 and the input device 22 are provided in the apparatus main body 20B, and the ultrasound probe 10A is connected to the apparatus main body 20B via the network NW. In this case, the apparatus main body 20B may be configured by a remote server. In addition, the apparatus main body 20B can be configured by a mobile terminal such as a smartphone or a tablet terminal.

In the first embodiment, for example, the following various processors may be used as a hardware structure of processing units that perform various processing, such as the main control unit 50, the image generation unit 51, the display control unit 52, the image analysis unit 53, and the highlight display unit 54. The various processors include, as described above, a CPU which is a general-purpose processor that functions as various processing units by executing software (program 26), and a dedicated electric circuit which is a processor having a circuit configuration specifically designed to execute specific processing, such as a programmable logic device (PLD) or an ASIC that is a processor of which the circuit configuration may be changed after manufacturing such as a field programmable gate array (FPGA).

One processing unit may be configured by one of these various processors, or may be configured by a combination of two or more processors having the same type or different types (for example, a combination of a plurality of FPGAs and/or a combination of a CPU and an FPGA). Further, the plurality of processing units may be configured by one processor.

As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units by one IC chip is used may be adopted. As described above, the various processing units are configured by using one or more various processors as a hardware structure.

Further, as the hardware structure of the various processors, more specifically, an electric circuit (circuitry) in which circuit elements such as semiconductor elements are combined may be used.

From the above description, the technique described in following Appendixes 1 to 9 can be understood.

[Appendix 1]

An information processing apparatus that performs processing on an ultrasound image, which is generated by transmitting ultrasound beams from a transducer array toward the inside of a living body and receiving ultrasound echoes generated in the living body, the apparatus including:

a processor, in which the processor is configured to:

detect a blood vessel region including a blood vessel from the ultrasound image;

detect a structure other than a blood vessel from the ultrasound image; and determine whether the blood vessel included in the blood vessel region is an artery or a vein based on a relative positional relationship between the blood vessel region and the structure.

[Appendix 2]

The information processing apparatus according to Appendix 1, in which the processor is configured to display the blood vessel region in the ultrasound image displayed on a display device such that the blood vessel included in the blood vessel region is identified as an artery or a vein.

[Appendix 3]

The information processing apparatus according to Appendix 2, in which the processor is configured to determine whether the blood vessel included in the blood vessel region is an artery or a vein based on the blood vessel region.

[Appendix 4]

The information processing apparatus according to Appendix 3, in which the processor is configured to correct a result of artery/vein determination based on the blood vessel region, based on a result of artery/vein determination based on a relative positional relationship between the blood vessel region and the structure.

[Appendix 5]

The information processing apparatus according to Appendix 4, in which the processor is configured to compare reliability of artery/vein determination based on the blood vessel region with reliability of artery/vein determination based on the relative positional relationship between the blood vessel region and the structure, and select a determination result having higher reliability.

[Appendix 6]

The information processing apparatus according to Appendix 5, in which the processor is configured to display, on the display device, reliability on the selected determination result.

[Appendix 7]

The information processing apparatus according to Appendix 6, in which the processor is configured to display, on the display device, a message urging an operator to pay attention in a case where the reliability on the selected determination result is lower than a certain value.

The technique of the present disclosure can also appropriately combine the various embodiments and/or the various modification examples. In addition, the technique of the present disclosure is not limited to the embodiments, and various configurations may be adopted without departing from the scope of the present disclosure.

The described contents and the illustrated contents are detailed explanations of a part according to the technique of the present disclosure, and are merely examples of the technique of the present disclosure. For example, the descriptions related to the configuration, the function, the operation, and the effect are descriptions related to examples of a configuration, a function, an operation, and an effect of a part according to the technique of the present disclosure. Therefore, it goes without saying that, in the described contents and illustrated contents, unnecessary parts may be deleted, new components may be added, or replacements may be made without departing from the spirit of the technique of the present disclosure. Further, in order to avoid complications and facilitate understanding of the part according to the technique of the present disclosure, in the described contents and illustrated contents, descriptions of technical knowledge and the like that do not require particular explanations to enable implementation of the technique of the present disclosure are omitted.

In the present specification, "A and/or B" is synonymous with "at least one of A or B." That is, "A and/or B" means that only A may be included, that only B may be included, or that a combination of A and B may be included.

All documents, patent applications, and technical standards mentioned in this specification are incorporated herein by reference to the same extent as in a case where each document, each patent application, and each technical standard are specifically and individually described by being incorporated by reference.

What is claimed is:

1. An information processing apparatus that performs processing on an ultrasound image, which is generated by transmitting ultrasound beams from a transducer array toward the inside of a living body and receiving ultrasound echoes generated in the living body, the apparatus including:
   a processor,
   in which the processor is configured to:
   detect, by image analysis, a blood vessel region including a blood vessel from the ultrasound image;
   detect, by image analysis, a structure other than a blood vessel from the ultrasound image;
   using the structure as a landmark, determine whether the blood vessel included in the blood vessel region is an artery or a vein based on a relative positional relationship between the landmark and the blood vessel region;
   compare reliability of artery/vein determination based on the blood vessel region with reliability of artery/vein determination based on a relative positional relationship between the blood vessel region and the structure, and select a determination result having higher reliability;
   and
   display the blood vessel region in the ultrasound image displayed on a display device such that the blood vessel included in the blood vessel region is identified as an artery or a vein.

2. The information processing apparatus according to claim 1, in which the processor is configured to determine whether the blood vessel included in the blood vessel region is an artery or a vein based on the blood vessel region.

3. The information processing apparatus according to claim 2, in which the processor is configured to correct a result of artery/vein determination based on the blood vessel region, based on a result of artery/vein determination based on the relative positional relationship between the blood vessel region and the structure.

4. The information processing apparatus according to claim 3, in which the processor is configured to display, on the display device, reliability on the selected determination result.

5. The information processing apparatus according to claim 4,
   in which the processor is configured to display, on the display device, a message urging an operator to pay attention in a case where the reliability on the selected determination result is lower than a certain value.

6. An information processing method for performing processing on an ultrasound image, which is generated by transmitting ultrasound beams from a transducer array toward the inside of a living body and receiving ultrasound echoes generated in the living body, the method comprising:
   detecting, by image analysis, a blood vessel region including a blood vessel from the ultrasound image;
   detecting, by image analysis, a structure other than a blood vessel from the ultrasound image;
   using the structure as a landmark, determining whether the blood vessel included in the blood vessel region is an artery or a vein based on a relative positional relationship between the landmark and the blood vessel region;
   comparing reliability of artery/vein determination based on the blood vessel region with reliability of artery/vein determination based on a relative positional relationship between the blood vessel region and the structure, and select a determination result having higher reliability;
   and
   displaying the blood vessel region in the ultrasound image displayed on a display device such that the blood vessel included in the blood vessel region is identified as an artery or a vein.

7. A non-transitory computer-readable storage medium storing a program causing a computer to execute a process for performing processing on an ultrasound image, which is generated by transmitting ultrasound beams from a transducer array toward the inside of a living body and receiving ultrasound echoes generated in the living body, the process comprising:
   detecting, by image analysis, a blood vessel region including a blood vessel from the ultrasound image;
   detecting, by image analysis, a structure other than a blood vessel from the ultrasound image;
   using the structure as a landmark, determining whether the blood vessel included in the blood vessel region is an artery or a vein based on a relative positional relationship between the landmark and the blood vessel region;
   comparing reliability of artery/vein determination based on the blood vessel region with reliability of artery/vein determination based on a relative positional relationship between the blood vessel region and the structure, and select a determination result having higher reliability;
   and displaying the blood vessel region in the ultrasound image displayed on a display device such that the blood vessel included in the blood vessel region is identified as an artery or a vein.

\* \* \* \* \*